United States Patent
Morita et al.

(10) Patent No.: US 8,303,848 B2
(45) Date of Patent: Nov. 6, 2012

(54) OPERATION METHOD OF SYNTHESIS GAS REFORMER IN GTL PLANT

(75) Inventors: Yasumasa Morita, Tokyo (JP); Kenichi Kawazuishi, Yokohama (JP)

(73) Assignees: Japan Oil, Gas and Metals National Corporation, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP); Chiyoda Corporation, Kanagawa (JP)

( * ) Notice: Subject to any disclaimer, the term of this patent is extended or adjusted under 35 U.S.C. 154(b) by 188 days.

(21) Appl. No.: 12/736,256

(22) PCT Filed: Mar. 30, 2009

(86) PCT No.: PCT/JP2009/056466
§ 371 (c)(1),
(2), (4) Date: Nov. 5, 2010

(87) PCT Pub. No.: WO2009/123095
PCT Pub. Date: Oct. 8, 2009

(65) Prior Publication Data
US 2011/0042619 A1 Feb. 24, 2011

(30) Foreign Application Priority Data

Mar. 31, 2008 (JP) ................................. 2008-089737

(51) Int. Cl.
*C01B 3/26* (2006.01)
*C01B 3/38* (2006.01)
(52) U.S. Cl. ........................................ 252/373; 423/651
(58) Field of Classification Search ................... 423/651
See application file for complete search history.

(56) References Cited

U.S. PATENT DOCUMENTS

| 3,285,320 A | 11/1966 | Clark |
| 3,894,832 A | 7/1975 | Chin et al. |
| 5,500,449 A | 3/1996 | Benham et al. |
| 6,489,370 B2 * | 12/2002 | Iijima et al. .................. 518/700 |

FOREIGN PATENT DOCUMENTS

AU 2007232922 12/2010
(Continued)

OTHER PUBLICATIONS

International Search Report dated Jun. 23, 2009 issued in corresponding PCT Application No. PCT/JP2009/056466.

(Continued)

*Primary Examiner* — Melvin C Mayes
*Assistant Examiner* — Kenneth Vaden
(74) *Attorney, Agent, or Firm* — Kenyon & Kenyon LLP

(57) ABSTRACT

An operation method of a synthesis gas reformer of a GTL (gas to liquids) plant is provided with: setting an operation condition of the synthesis gas reformer; determining control target values of a flow rate of the light hydrocarbon gas, the steam, and the $CO_2$, and an amount of heat needed for the synthesis gas reformer; controlling operation load of the synthesis gas reformer; setting a furnace efficiency of the synthesis gas reformer; calculating a combustion load of a burner of the synthesis gas reformer; calculating a lower heating value of the fuel gas based on a composition measurement of the fuel gas of the burner; determining a control target value of the pressure of the fuel gas; calculating a deviation between the control target value of the pressure of the fuel gas and a measured value of the pressure of the fuel gas; and controlling the temperature of the synthesis gas at the outlet of the synthesis gas reformer by adjusting a pressure control valve provided at an inlet of the burner to compensate for the deviation.

2 Claims, 10 Drawing Sheets

FOREIGN PATENT DOCUMENTS

| | | |
|---|---|---|
| EP | 1180544 | 2/2002 |
| JP | 07-206401 | 8/1995 |
| JP | 8-273685 | 10/1996 |
| JP | 2004-217505 | 8/2004 |
| JP | 2006-40597 | 2/2006 |
| JP | 2007-200771 | 8/2007 |
| WO | 2007/114274 | 10/2007 |

OTHER PUBLICATIONS

Instrumentation handbook; Instrumentation & Process Control Engineer's Association, May 1, 1991, p. 3-29 [with English Translation].

Canadian Office Action, dated Jan. 23, 2012, issued in corresponding Canadian Application No. 2718956.

European Search Report, dated Jun. 14, 2012, issued in corresponding European Application No. 09727161.3.

* cited by examiner

OPERATION METHOD OF SYNTHESIS GAS REFORMER IN GTL PLANT

This application is a national stage application of International Application No. PCT/JP2009/056466, filed Mar. 30, 2009, which claims priority to Japanese Patent Application No. 2008-89737, filed on Mar. 31, 2008, the content of which is incorporated herein by reference.

TECHNICAL FIELD

The present invention relates to an operation method of a synthesis gas reformer in a GTL (gas to liquids) plant.

BACKGROUND ART

GTL (gas to liquids) is a technique for producing petroleum products such as naphtha, gas oil, kerosene, and the like from light hydrocarbon gas. A GTL plant includes, for example, a synthesis gas section for producing synthesis gas by reforming natural gas as the light hydrocarbon gas, a Fisher-Tropsch (FT) section for producing liquid hydrocarbon from the synthesis gas produced in the synthesis gas section by FT synthesis, and an upgrading section for performing hydroprocessing on the liquid hydrocarbon produced in the FT section to produce oil products such as naphtha, gas oil, kerosene, and the like.

In the synthesis gas section, the natural gas is added with hydrogen for desulfurization, steam and carbon dioxide ($CO_2$) are mixed therewith, and the mixture is supplied to a synthesis gas reformer to be reformed, thereby producing synthesis gas mainly containing carbon monoxide (CO) gas and hydrogen ($H_2$) gas. Here, temperature control of the synthesis gas of the outlet of the synthesis gas reformer influences a $H_2$/CO ratio of the synthesis gas, and further influences the production fraction and purity of end products such as naphtha, gas oil, kerosene, and the like.

As a method of controlling the temperature of the synthesis gas of the outlet of the synthesis gas reformer, there is a conventional temperature control (TC)/pressure control (PC) cascade control method of controlling the output of a burner that is a heat source of the synthesis gas reformer according to the outlet temperature of the synthesis gas reformer (for example, see Non-Patent Document 1). The control method is described with reference to FIGS. 9 and 10. FIG. 9 is a view for explaining a temperature control system of a furnace 900. FIG. 10 is a flowchart for explaining a cascade control logic of the conventional method.

As illustrated in FIG. 9, the furnace 900 has a burner 902 and a heating pipe 904. The outlet of the furnace 900 is provided with temperature measuring device 922 for measuring the outlet temperature and temperature controller 924. In addition, on the inlet side (fuel gas supply side) of the burner 902, pressure measuring device 934 and a pressure control valve 940 are provided, and the pressure measuring device 934 and the pressure control valve 940 are connected to pressure controller 932.

Next, the temperature control method of the outlet of the furnace 900 is described. A to-be-heated fluid 910 is heated by the burner 902 while flowing through the heating pipe 904 and becomes a heated fluid 918. The temperature of the heated fluid 918 is measured by the temperature measuring device 922 provided on the outlet side of the furnace 900, and the opening degree of the control valve 940 is adjusted on the basis of the measured temperature. Accordingly, the pressure and flow rate of fuel gas 916 is controlled, and output control of the burner 902 is performed, thereby performing the temperature control of the heated fluid 918.

The above-mentioned TC/PC cascade control is described in detail with reference to FIG. 10. A target value (SV) of the outlet temperature of the furnace 900 is set in step S960. The temperature of the heated fluid 918 is measured by the temperature measuring device 922 thereby measuring a measured value (PV) in step S962. A temperature difference $\Delta T$ between the SV and the PV of the outlet temperature is calculated by the temperature controller 924 in step S964, and in order to compensate for the $\Delta T$, control output of the furnace outlet temperature is performed in step S966. Next, in the pressure controller 932, a control target value (SV) of the pressure of the fuel gas 916 is set in step S968. The pressure measuring device 934 measures the pressure of the fuel gas 916 thereby measuring a measured value in step S970. A pressure difference $\Delta P$ between the SV and the PV of the pressure of the fuel gas 916 is calculated in step S972, and for the pressure control valve 940, control output for determining the opening degree of the pressure control valve 940 is performed in step S974 to control the output of the burner, thereby enabling control of the outlet temperature of the furnace 900.

[Non-Patent Document 1]: Instrumentation handbook, Instrumentation & Process Control Engineer's Association, May 1, 1991, p. 3-29.

DISCLOSURE OF THE INVENTION

Problem that the Invention is to Solve

However, when the synthesis gas reformer of the GTL applies the aforementioned TC/PC cascade control method, due to the following (1) to (5) factors, the heating load or the properties of the fuel gas rapidly change. Therefore, there was a problem in that precise control of the outlet temperature of the synthesis gas reformer was difficult.

(1) Change in composition of the light hydrocarbon gas as the raw material (2) Change in plant operation load (producing load)

(3) Change in operation condition (the molar ratio of steam to the numbers of carbon atoms of light hydrocarbon gas, the molar ratio of $CO_2$ to the number of carbon atoms of light hydrocarbon gas, and the outlet temperature of the synthesis gas reformer) of the synthesis gas reformer (4) Change in operation condition (a conversion rate and a recycle ratio) of a bubble column reactor in the FT section (5) Change in operation condition (fractionation specification (distillation specification of a distillation tower)) in the upgrading section When the precise control of the outlet temperature of the synthesis gas reformer cannot be implemented, the composition of the synthesis gas may change. Therefore, the $H_2$/CO ratio and the like may deviate from an acceptable range of the process of the GTL. In addition, when offgas discharged from each section of the GTL plant is mixed to be supplied to the fuel gas of the synthesis gas reformer, the temperature control of the outlet of the synthesis gas reformer becomes more difficult. Conventionally, when the variation factors as described above occurred, operation control of the synthesis gas reformer was manually performed. Accordingly, much time and labor were needed. For example, in order to increase or decrease the plant operation load by 10% while suppressing the variation in outlet temperature of the synthesis gas reformer, in some cases, 8 or more hours were needed for a transition to a desired plant operation load.

An object of the invention is to provide an operation method of a synthesis gas reformer of a GTL plant, which enables precise control of the outlet temperature of the synthesis gas reformer.

Means for Solving the Problem

According to the invention, an operation method of a synthesis gas reformer of a GTL (gas to liquids) plant having a process for producing synthesis gas by adding at least steam and $CO_2$ to light hydrocarbon gas to form a mixed fluid and heating the mixed fluid. The operation method is provided with: setting an operation condition including control target values of a flow rate of $H_2$ and CO contained in synthesis gas reformed by the synthesis gas reformer, a $H_2$/CO ratio which is defined by a ratio of the number of moles of $H_2$ contained in the synthesis gas to the number of moles of CO contained in the synthesis gas, a steam/carbon ratio which is defined by a ratio of the number of moles of steam added to the mixed fluid to the number of moles of carbon contained in the light hydrocarbon gas, a $CO_2$/carbon ratio which is defined by a ratio of the number of moles of $CO_2$ added to the mixed fluid to the number of moles of carbon contained in the light hydrocarbon gas, and a temperature of the synthesis gas at an outlet of the synthesis gas reformer; determining control target values of a flow rate of the light hydrocarbon gas, a flow rate of the steam and a flow rate of the $CO_2$, and an amount of heat needed for the synthesis gas reformer, by the operation condition set, a measured value of the composition of the light hydrocarbon gas, a measured value of the temperature of the mixed fluid at an inlet of the synthesis gas reformer, and a measured value of the pressure of the synthesis gas at the outlet of the synthesis gas reformer; controlling operation load of the synthesis gas reformer on the basis of the control target values of the flow rate of the light hydrocarbon gas, the flow rate of the steam, and the flow rate of the $CO_2$; setting a furnace efficiency of the synthesis gas reformer; calculating a combustion load of a burner of the synthesis gas reformer based on values of the furnace efficiency and the amount of heat needed for the synthesis gas reformer; calculating a lower heating value of the fuel gas based on a composition measurement of the fuel gas of the burner; determining a control target value of the pressure of the fuel gas by the combustion load of the burner, the lower heating value of the fuel gas, and a burner performance curve of the synthesis gas reformer; calculating a deviation between the control target value of the pressure of the fuel gas and a measured value of the pressure of the fuel gas; and controlling the temperature of the synthesis gas at the outlet of the synthesis gas reformer by adjusting a pressure control valve provided at an inlet of the burner to compensate for the deviation.

The value of the furnace efficiency may be calculated based on measured values of the temperature of a combustion exhaust gas of the synthesis gas reformer, the amount of heat needed for the synthesis gas reformer, a fuel-air ratio of the burner, and the pressure of the fuel gas.

Advantage of the Invention

According to the operation method of the synthesis gas reformer of the invention, in the GTL plant, precise control of the operation load and the outlet temperature of the synthesis gas reformer can be performed.

DESCRIPTION OF REFERENCE NUMERALS

8: GTL PLANT
20: SYNTHESIS GAS REFORMER
200: BURNER
214: PRESSURE CONTROL VALVE

BEST MODE FOR CARRYING OUT THE INVENTION

Figure 1:
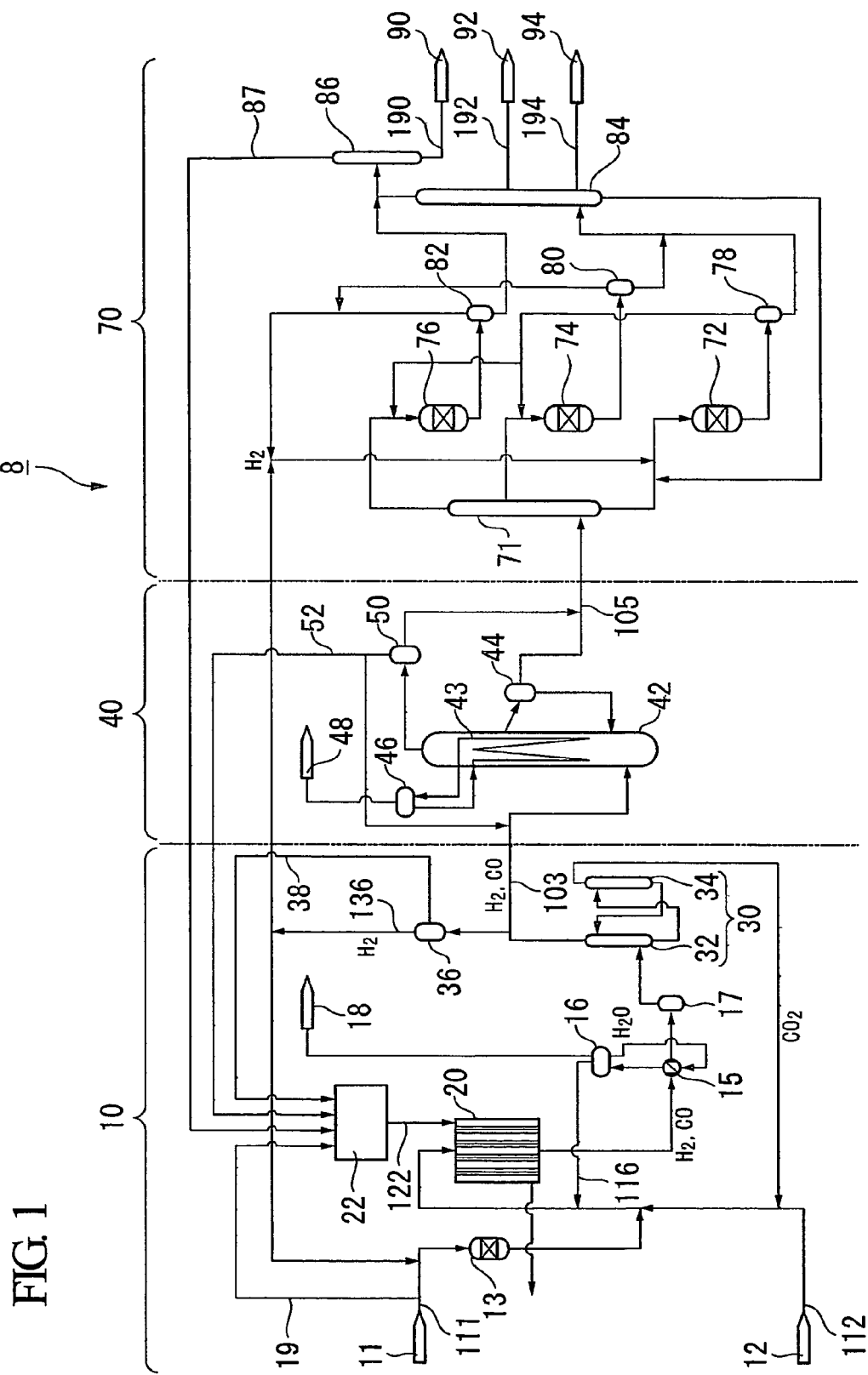
FIG. 1 is a schematic view illustrating a GTL (gas to liquids) plant according to an embodiment of the present invention.
Figure 2:
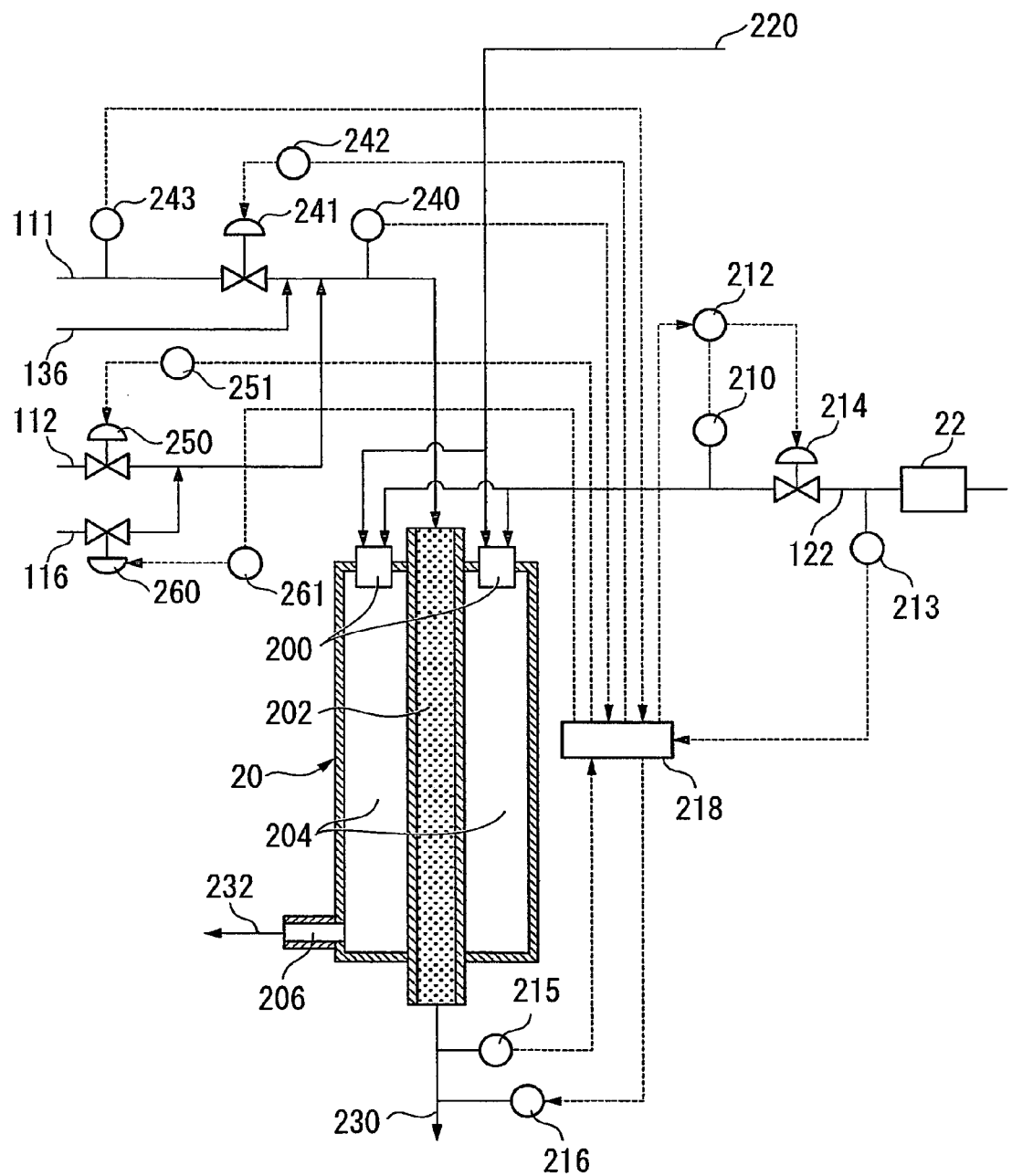
FIG. 2 is a schematic view illustrating a synthesis gas reformer according to the embodiment of the present invention.

An example of an embodiment of the invention will now be described. First, a GTL (gas to liquids) plant applying an operating method of a synthesis gas (synthesis gas) reformer of the invention is described with reference to FIGS. 1 and 2. FIG. 1 is a schematic view illustrating the GTL plant 8 used for carrying out the invention. FIG. 2 is a schematic view illustrating the synthesis gas reformer 20 according to the embodiment of the invention.

According to the invention, light hydrocarbon gas includes natural gas, oil field associated gas, liquefied petroleum gas (LPG), and the like, and represents hydrocarbon having the number of carbon atoms of $C_1$ to $C_5$. In the description of the embodiment, as the raw material of the light hydrocarbon gas, natural gas is exemplified.

The GTL plant 8 is a plant for performing a GTL process to convert the raw material of the light hydrocarbon gas such as the natural gas into a liquid fuel. As illustrated in FIG. 1, the GTL plant 8 includes a synthesis gas section 10, a Fischer-Tropsch (FT) section 40, and an upgrading section 70. The synthesis gas section 10 produces synthesis gas containing carbon monoxide (CO) gas and hydrogen gas ($H_2$) by reforming the natural gas that is the hydrocarbon raw material. The FT section 40 produces FT oil that is liquid hydrocarbon formed from the produced synthesis gas by an FT synthesis reaction. The upgrading section 70 produces the liquid fuel products (naphtha, kerosene, gas oil, wax, and the like) by hydrotreating the FT oil produced by the FT synthesis reaction. Hereinafter, the components of each unit will be described.

The synthesis gas section 10 mainly includes, for example, a desulfurization reactor 13, a synthesis gas reformer 20, an waste heat boiler 15, a steam drum 16, a vapor-liquid separator 17, a $CO_2$ remover 30, and a hydrogen separator 36.

The desulfurization reactor 13 is connected to a natural gas supply source 11 and the hydrogen separator 36. The outlet of the desulfurization reactor 13, a carbon dioxide ($CO_2$) supply source 12, and a fuel gas drum 22 are connected to the synthesis gas reformer 20. The outlet of the synthesis gas reformer 20 is connected to the waste heat boiler 15. The waste heat boiler 15 is connected to the steam drum 16 and the vapor-liquid separator 17. The outlet of the steam drum 16 is connected to a high-pressure steam storage tank 18, the synthesis gas reformer 20, and the waste heat boiler 15. The vapor-liquid separator 17 is connected to the $CO_2$ remover 30. The outlet of the $CO_2$ remover 30 is connected to the hydrogen separator 36 and the inlet of a bubble column reactor (bubble column hydrocarbon synthesis reactor) 42. The hydrogen separator 36 is connected to the fuel gas drum 22 through a pipe 38.

The desulfurization reactor 13 is constructed as a hydrodesulfurization apparatus or the like and is an apparatus for removing sulfur components from the natural gas that is the raw material.

The waste heat boiler 15 is an apparatus for generating high-pressure steam by recovering waste heat of the synthesis gas produced by the synthesis gas reformer 20.

The steam drum 16 is an apparatus for separating water heated by heat exchange with the synthesis gas in the waste heat boiler 15, into vapor (high-pressure steam) and liquid.

The vapor-liquid separator 17 is an apparatus for separating condensed components from the synthesis gas cooled in the waste heat boiler 15 and supplying a gaseous component to the $CO_2$ remover 30.

The $CO_2$ remover 30 is an apparatus including an adsorption tower 32 for removing carbon dioxide gas from the synthesis gas supplied from the vapor-liquid separator 17 by using an adsorption solution, and a regerenartor 34 for allowing the carbon dioxide gas to diffuse from the adsorption solution containing the corresponding carbon dioxide gas to be regenerated.

The synthesis gas reformer 20 is an apparatus for generating the synthesis gas mainly containing carbon monoxide gas (CO) and hydrogen gas ($H_2$) by reforming the natural gas supplied from the desulfurization reactor 13. The synthesis gas reformer 20 is described with reference to FIG. 2. In addition, for the convenience of description, in FIG. 2, the desulfurization reactor for mixing the natural gas with the hydrogen gas and desulfurizing the mixture is omitted.

As illustrated in FIG. 2, the synthesis gas reformer 20 includes a furnace 204 that is substantially cylindrical, a burner 200 provided to the furnace 204, a catalyst tube 202 provided substantially at the center of the furnace 204, and a combustion gas exhaust outlet 206 provided to the furnace 204. The burner 200 is connected to a supply source of combustion air 220. In addition, the burner 200 is connected to the fuel gas drum 22. The inlet of the catalyst tube 202 is provided with temperature measuring device 240 for measuring the temperature (the inlet temperature of the synthesis gas reformer 20) of a mixed fluid containing natural gas 111, $CO_2$ gas 112, steam 116, and hydrogen gas 136, a flow control valve 241 for controlling the flow rate of the natural gas 111, and a composition measuring device 243 for the natural gas 111. In addition, a flow control valve 250 for controlling the flow rate of the $CO_2$ gas 112 and a flow control valve 260 for controlling the flow rate of the steam 116 are further provided thereto. The flow control valve 241 is connected to a flow controller 242, the flow control valve 250 is connected to a flow controller 251, and the flow control valve 260 is connected to a flow controller 261. In addition, the flow controllers 242, 251, and 261 are connected to an operation control system 218.

On the inlet side of the burner 200, a pressure measuring device 210 for fuel gas 122 and a composition measuring device 213 for the fuel gas are provided, and in the upstream of the pressure measuring device 210, a pressure control valve 214 is provided. A pressure controller 212 is connected to the pressure measuring device 210 and the pressure control valve 214. The pressure controller 212 is connected to the operation control system 218.

On the outlet side of the synthesis gas reformer 20, a pressure measuring device 215 for measuring the pressure of synthesis gas 230 and temperature measuring device 216 for measuring the temperature of the synthesis gas 230 are provided. In addition, the pressure measuring device 215 and the temperature measuring device 216 are connected to the operation control system 218.

The burner 200 is not particularly limited, and any existing apparatus capable of burning the fuel gas 122 to provide a desired amount of heat in the furnace 204 may be used as the burner 200.

A catalyst filling the catalyst tube 202 catalyzes a steam/carbon dioxide reforming reaction and is not particularly limited. For example, reforming catalysts such as nickel/alumina and nickel/magnesia/alumina may be used.

The temperature measuring devices 216 and 240 are not particularly limited. For example, an existing thermocouple-type thermometer and the like may be used.

The pressure measuring devices 210 and 215 are not particularly limited. For example, an existing diaphragm type and the like may be used.

The composition measuring devices 213 and 243 are not particularly limited. For example, gas chromatography and the like may be used.

The pressure controller 212 is not particularly limited, and any device for receiving outputs from the operation control system 218 and controlling the opening degree of the pressure control valve 214 may be used.

The flow controllers 242, 251, and 261 are not particularly limited, and any device for receiving outputs from the operation control system 218 and controlling the opening degrees of the flow control valves 241, 250, and 260 may be used.

The hydrogen separator 36 is an apparatus for separating a portion of the hydrogen gas contained in the synthesis gas into separated-hydrogen gas, from the synthesis gas from which the carbon dioxide gas is separated by the $CO_2$ remover 30.

The hydrogen separator 36 is provided to a branch line that braches off from a main pipe connecting the $CO_2$ remover 30 or the vapor-liquid separator 17 to the bubble column reactor (bubble column hydrocarbon synthesis reactor) 42. The hydrogen separator 36 is configured as, for example, a hydrogen separator (pressure swing adsorption) for allowing adsorption and desorption of hydrogen by using pressure differences. The hydrogen separator has an adsorbent (zeolite-based adsorbent, activated carbon, alumina, silica gel, and the like) in a plurality of adsorption towers arranged in parallel, and in each adsorption tower, pressurization, adsorption, desorption (pressure reduction), and purging of hydrogen are sequentially repeated, thereby continuously supplying hydrogen gas with a high purity (for example, of approximately 99.999%) separated from the synthesis gas to a predetermined destination. In addition, the hydrogen gas separation method used for the hydrogen separator 36 is not limited to the pressure swing adsorption used for the hydrogen separator. For example, hydrogen storage alloy adsorption, membrane separation, and the like may be used singly or in combination thereof.

The FT section 40 mainly includes, for example, the bubble column reactor 42, a steam drum 46, a separator 44, and a vapor-liquid separator 50.

The bubble column reactor 42 is connected to the $CO_2$ remover 30 and the separator 44. A cooling pipe 43 of the bubble column reactor 42 is connected to the steam drum 46, and the steam drum 46 is connected to a medium-pressure steam storage tank 48. The outlet of the bubble column reactor 42 is connected to the vapor-liquid separator 50 and the separator 44, and the vapor-liquid separator 50 is connected to the fuel gas drum 22 through a pipe 52. In addition, the separator 44 and the vapor-liquid separator 50 are connected to a first fractionator 71 of the upgrading section 70.

The bubble column reactor 42 is an example of a reactor for synthesizing liquid hydrocarbon from the synthesis gas, and is an apparatus that functions as an FT synthesis reactor for synthesizing liquid hydrocarbon from the synthesis gas by the FT synthesis reaction. The bubble column reactor 42 has the cooling pipe 43.

The steam drum 46 is an apparatus for separating water which flows through the cooling pipe 43 disposed inside the bubble column reactor 42 to be heated and separated into steam (medium-pressure steam) and liquid.

The separator 44 is an apparatus connected to the bubble column reactor 42 to perform separation processing on the liquid hydrocarbon and catalyst particles.

The vapor-liquid separator 50 is an apparatus for performing cooling and separation on unreacted synthesis gas and gaseous hydrocarbon.

The upgrading section 70 includes, for example, the first fractionator 71, a WAX fraction hydrocracking reactor 72, a kerosene/gas oil fraction hydrotreating reactor 74, a naphtha fraction hydrotreating reactor 76, vapor-liquid separators 78, 80, and 82, a second fractionator 84, and a naphtha stabilizer 86.

The bottom of the first fractionator 71 is connected to the WAX fraction hydrocracking reactor 72. The center of the first fractionator 71 is connected to the kerosene/gas oil fraction hydrotreating reactor 74. The top of the first fractionator 71 is connected to the naphtha fraction hydrotreating reactor 76. The WAX fraction hydrocracking reactor 72 is connected to the vapor-liquid separator 78, the kerosene/gas oil fraction hydrotreating reactor 74 is connected to the vapor-liquid separator 80, and the naphtha fraction hydrotreating reactor 76 is connected to the vapor-liquid separator 82. The vapor-liquid separator 82 is connected to the naphtha stabilizer 86. The vapor-liquid separators 78 and 80 are connected to the second fractionator 84. The second fractionator 84 is connected to the naphtha stabilizer 86, a kerosene storage tank 92, and a gas oil storage tank 94. The naphtha stabilizer 86 is connected to a naphtha storage tank 90 and also connected to the fuel gas drum 22 through a pipe 87.

The first fractionator 71 is an apparatus for distilling the liquid hydrocarbon supplied from the bubble column reactor 42 through the separator 44 and the vapor-liquid separator 50 to be separated and fractionated into fractions according to boiling points.

The second fractionator 84 is an apparatus for separating and fractionating the liquid hydrocarbon supplied from the vapor-liquid separators 78 and 80 according to boiling points.

The naphtha stabilizer 86 is an apparatus for fractionating the liquid hydrocarbon of the naphtha fraction supplied from the vapor-liquid separator 82 and the second fractionator 84 and exhausting and supplying components lighter than butane to the fuel gas drum 22 as upgrading offgas, thereby separating and recovering components having the number of carbon atoms of 5 or larger as naphtha of products.

Figure 3:
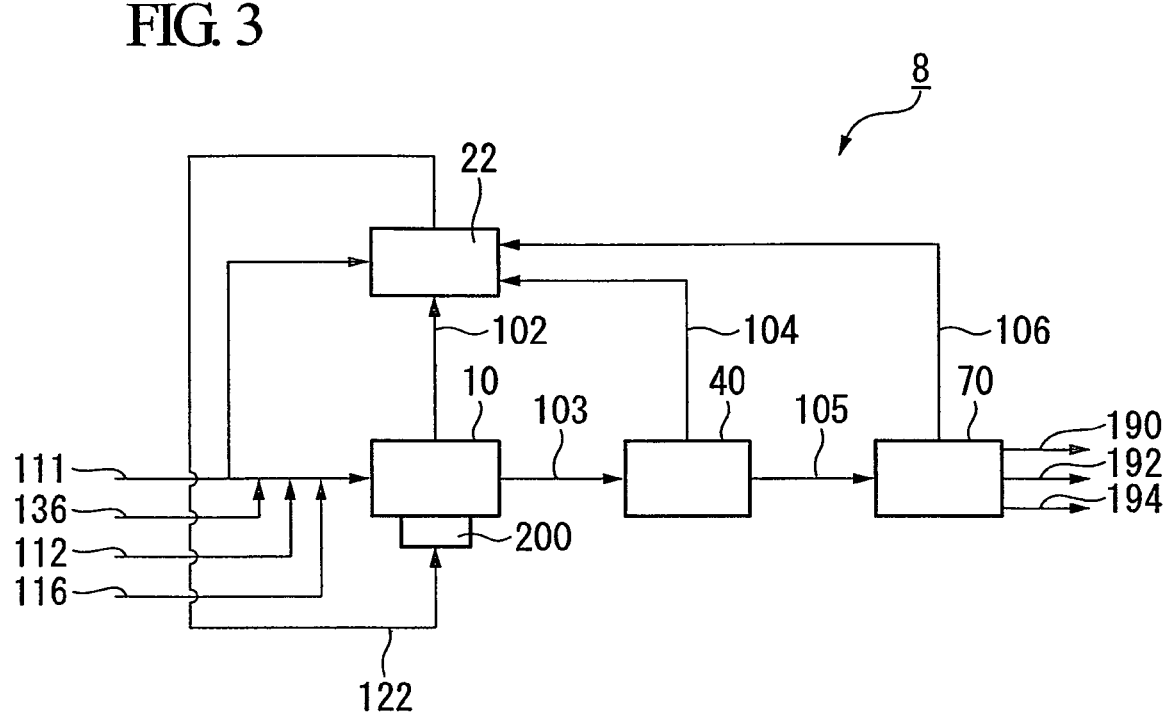
FIG. 3 is a block flow illustrating a producing method of petroleum products according to the embodiment of the present invention.

The producing method of petroleum products by the GTL plant 8 will be described with reference to FIGS. 1 to 3. FIG. 3 is a block flow for schematically explaining a producing process of the petroleum products of the GTL plant 8 and the flow of the fuel gas 122.

First, the producing method of petroleum products by the GTL plant 8 is schematically described with reference to FIG. 3. As illustrated in FIG. 3, a mixed fluid containing the natural gas 111, the $CO_2$ gas 112, the steam 116, and the hydrogen gas 136 is supplied to the synthesis gas section 10. From the fuel gas drum 22, the fuel gas 122 is supplied to the burner 200 of the synthesis gas reformer 20 (FIG. 2) of the synthesis gas section 10. The natural gas 111 is reformed into purified synthesis gas 103 by the synthesis gas section 10 and supplied to the FT section 40. Meanwhile, hydrogenseparator offgas 102 produced as a byproduct is supplied to the fuel gas drum 22. Next, in the FT section 40, the refined synthesis gas 103 is converted into the FT oil 105, and the FT oil 105 is supplied to the upgrading section 70. FT offgas 104 produced as a byproduct is supplied to the fuel gas drum 22. In the upgrading section 70, naphtha 190, kerosene 192, and gas oil 194 are purified. Upgrading offgas 106 produced as a byproduct is supplied to the fuel gas drum 22. In addition, a portion of the natural gas 111 is supplied to the fuel gas drum 22 as the fuel gas. Accordingly, the fuel gas drum 22 stores the fuel gas 122 which is the mixture of the natural gas 111, the hydrogenseparator offgas 102, the FT offgas 104, and the upgrading offgas 106, and supplies the fuel gas 122 to the burner 200.

This will be described in detail with reference to FIGS. 1 and 2. The natural gas (mainly containing $CH_4$) 111 as the light hydrocarbon gas is supplied from a natural gas field or an external natural gas supply source 11 such as a natural gas plant to the GTL plant 8. The synthesis gas section 10 produces the purified synthesis gas 103 (mixed gas mainly containing carbon monoxide and hydrogen gas) by reforming the natural gas 111.

First, the natural gas 111 is supplied to the desulfurization reactor 13 along with the hydrogen gas 136 separated by the hydrogen separator 36. The desulfurization reactor 13 desulfurizes the natural gas 111 by using the hydrogen gas 136 to remove a sulfur content with, for example, a ZnO catalyst. By desulfurizing the natural gas 111 in advance as described above, the deactivation of the catalyst used in the synthesis gas reformer 20, the bubble column reactor 42, and the like due to the sulfur can be prevented.

The desulfurized natural gas 111 (which may include carbon dioxide) is mixed with the $CO_2$ gas 112 supplied from the $CO_2$ supply source 12, the steam 116 generated in the waste heat boiler 15, and the hydrogen gas 136 added for the hydrogenation and desulfurization of the desulfurization reactor 13 as a mixed fluid so as to be supplied to the synthesis gas reformer 20. The synthesis gas reformer 20 reforms the natural gas 111 in a steam/carbon dioxide gas reforming method by using the $CO_2$ gas 112 and the steam 116 to produce the high-temperature synthesis gas mainly containing carbon monoxide gas and hydrogen gas. Here, the fuel gas 122 and air are supplied to the burner 200 of the synthesis gas reformer 20, and the combustion heat of the fuel gas 122 in the burner 200 and the radiation heat from the furnace 204 of the synthesis gas reformer 20 are supplied as the heat of reaction needed for the steam/carbon dioxide reforming reaction that is an endothermic reaction.

In the synthesis gas reformer 20, the natural gas is reformed by using the $CO_2$ gas 112 and the steam 116 in the steam/ carbon dioxide gas reforming method represented as, for example, the following expressions (1) and (2), thereby producing the high-temperature synthesis gas mainly containing the carbon monoxide gas and the hydrogen gas.

$$CH_4 + H_2O \rightarrow CO + 3H_2 \quad (1)$$

$$CH_4 + CO_2 \rightarrow 2CO + 2H_2 \quad (2)$$

The high-temperature synthesis gas (for example, at 900° C., 2.0 MPaG) produced by the synthesis gas reformer 20 as described above is supplied to the waste heat boiler 15, and cooled (for example, to 280° C.) by heat exchange with the water flowing through the waste heat boiler 15, thereby recovering waste heat. Here, the water heated by the synthesis gas in the waste heat boiler 15 is supplied to the steam drum 16, a vapor component as high-pressure steam (for example, at 3.4 to 10.0 MPaG) is supplied from the steam drum 16 through the synthesis gas reformer 20 or the high-pressure stream storage tank 18 to other external apparatuses, and water as a liquid component is returned to the waste heat boiler 15.

From the synthesis gas cooled in the waste heat boiler 15, condensed liquid components are separated and removed by the vapor-liquid separator 17, and the separated synthesis gas is supplied to the absorber 32 of the $CO_2$ remover 30. An absorption solution stored in the absorber 32 adsorbs the carbon dioxide gas included in the synthesis gas, thereby separating the carbon dioxide gas from the synthesis gas. The adsorption solution containing the carbon dioxide gas in the absorber 32 is supplied to the regenerator 34, and the adsorption solution containing the carbon dioxide gas is heated by, for example, steam to be subjected to a stripping treatment, and the stripped carbon dioxide gas is supplied to the synthesis gas reformer 20 from the regenerator 34 to be re-used for the reforming reaction.

The purified synthesis gas 103 produced by the synthesis gas section 10 as described above is supplied to the bubble column reactor 42 of the FT section 40. The composition ratio of the synthesis gas supplied to the bubble column reactor 42 is controlled to be a composition ratio (for example, $H_2:CO=2:1$ (molal ratio)) suitable for the FT synthesis reaction. In addition, the synthesis gas supplied to the bubble column reactor 42 is compressed by a compressor (not shown) provided to a pipe connecting the $CO_2$ remover 30 to the bubble column reactor 42 to a pressure (for example, to 3.6 MPaG) suitable for the FT synthesis reaction. Here, in some cases, the compressor may not be needed.

A portion of the purified synthesis gas 103 from which the carbon dioxide gas is separated by the $CO_2$ remover 30, is also supplied to the hydrogen separator 36. The hydrogen separator 36 separates the hydrogen gas 136 from the synthesis gas by the pressure swing adsorption (PSA). The separated hydrogen gas 136 is continuously supplied from a gas holder (not shown) or the like through a compressor (not shown), to various hydrogen-use reaction apparatuses (for example, the desulfurization reactor 13, the WAX fraction hydrocracking reactor 72, the kerosene/gas oil fractions hydrotreating reactor 74, the naphtha fraction hydrotreating reactor 76, and the like) for predetermined reactions using hydrogen in the GTL plant 8. The hydrogenseparator offgas 102 after the hydrogen-separation is supplied from the hydrogen separator 36 through the pipe 38 to the fuel gas drum 22.

Next, the FT section 40 synthesizes the FT oil 105 from the purified synthesis gas 103 produced in the synthesis gas section 10, by the FT synthesis reaction.

Specifically, the purified synthesis gas 103 produced by the synthesis gas section 10 is supplied from the bottom of the bubble column reactor 42 to rise in a slurry containing the liquid hydrocarbon (product of the FT synthesis reaction) and catalyst particles as a suspended matter, inside the reactor main body. Here, inside the reactor main body, the carbon monoxide and the hydrocarbon gas contained in the purified synthesis gas 103 react by the FT synthesis reaction, thereby producing hydrocarbon. During the synthesis reaction, water flows through the cooling pipe 43 to remove the heat of reaction of the FT synthesis reaction, and a portion of the water heated by the heat exchange is vaporized to become steam. The water separated from the steam by the steam drum 46 is returned to the cooling pipe 43, and the vapor component is supplied to external apparatuses through the medium-pressure steam storage tank 48 as the medium-pressure steam (for example, at 1.0 to 2.5 MPaG).

The liquid hydrocarbon synthesized by the bubble column reactor 42 is flowed out from the bubble column reactor 42 to the separator 44 as a slurry. The separator 44 separates the flowed slurry into a solid component such as the catalyst particles and a liquid component containing the liquid hydrocarbon. A portion of the solid component such as the separated catalyst particles is returned to the bubble column reactor 42. In addition, unreacted synthesis gas and a gas component of the synthesized hydrocarbon are supplied from the gas outlet of the bubble column reactor 42 to the vapor-liquid separator 50. The vapor-liquid separator 50 cools the gases so that liquid including some condensed liquid hydrocarbon is separated. The FT oil 105 including the liquid component separated by the separator 44 and the liquid component separated by the vapor-liquid separator 50 is supplied to the first fractionator 71. In the gas component separated by the vapor-liquid separator 50, the unreacted synthesis gas ($CO$ and $H_2$) is recycled to the bottom of the bubble column reactor 42 to be re-used for the FT synthesis reaction. In addition, the FT offgas 104 mainly containing the hydrocarbon gas having a small number of carbon atoms ($C_4$ or less) is supplied to the fuel gas drum 22 through the pipe 52.

In the bubble column reactor 42, through contact catalysis, the synthesis reaction of the liquid hydrocarbon occurs (the FT synthesis reaction). Specifically, as represented as the following expression (3), the hydrogen gas and the carbon monoxide gas generate the synthesis reaction.

$$2nH_2 + nCO \rightarrow (CH_2)_n + nH_2O \quad (3)$$

The first fractionator 71 of the upgrading section 70 distills the FT oil (with various carbon numbers) 105 supplied from the bubble column reactor 42 through the separator 44 and the vapor-liquid separator 50 as described above to be fractionated according to different boiling points, thereby fractionating the FT oil 105 into a naphtha fraction (having a boiling point of less than approximately 150° C.), kerosene/gas oil fractions (having boiling points of approximately 150 to 350° C.), and a WAX fraction (having a boiling point of higher than approximately 350° C.). In addition, the liquid hydrocarbon (generally $C_{21}$ or larger) of the WAX fraction flowed out from the bottom of the first fractionator 71 is supplied to the WAX fraction hydrocracking reactor 72, the liquid hydrocarbon (generally $C_{11}$ to $C_{20}$) of the kerosene and gas oil fractions flowed out from the center of the first fractionator 71 is supplied to the kerosene/gas oil fraction hydrotreating reactor 74, and the liquid hydrocarbon (generally $C_5$ to $C_{10}$) of the naphtha fraction flowed out from the top of the first fractionator 71 is supplied to the naphtha fraction hydrotreating reactor 76.

The WAX fraction hydrocracking reactor 72 performs hydrocracking on the liquid hydrocarbon (generally $C_{21}$ or larger) of the WAX fraction which is supplied from the bottom of the first fractionator 71 and has a large number of carbon atoms, by using the hydrogen gas 136 supplied from the hydrogen separator 36, thereby reducing the number of carbon atoms to be $C_{20}$ or less. In the hydrocracking reaction, C—C bonds of the hydrocarbon with the larger number of carbon atoms are cracked by using catalysts and heat thereby producing hydrocarbon with a smaller number of carbon atoms and molecules. Products containing the liquid hydrocarbon hydrocracked by the WAX fraction hydrocracking reactor 72 are separated into vapor and liquid by the vapor-liquid separator 78, and liquid hydrocarbon therefrom is supplied to the second fractionator 84. Meanwhile, the gaseous component (containing hydrogen gas) is supplied to the kerosene/gas oil fraction hydrotreating reactor 74 and the naphtha fraction hydrotreating reactor 76.

The kerosene/gas oil fraction hydrotreating reactor 74 performs hydrotreating on the liquid hydrocarbon (generally $C_{11}$ to $C_{20}$) of the kerosene/gas oil fractions which are supplied from the center of the first fractionator 71 and have a medium number of carbon atoms, by using the hydrogen gas 136 supplied from the hydrogen separator 36 through the WAX fraction hydrocracking reactor 72. The hydrotreating reaction is a reaction in which isomerizations of the liquid hydrocarbon occurs, and hydrogen is added to unsaturated bonds of the liquid hydrocarbon to produce branched-chain saturated hydrocarbon. As a result, products containing the hydrotreated liquid hydrocarbon are separated into vapor and liquid by the vapor-liquid separator 80, and liquid hydrocarbon among them is supplied to the second fractionator 84. Meanwhile, the gaseous component (containing hydrogen gas) is re-used for the hydrotreating reaction.

The naphtha fraction hydrotreating reactor 76 performs hydrotreating on the liquid hydrocarbon (generally $C_{10}$ or less) of the naphtha fraction which is supplied from the top of the first fractionator 71 and has a small number of carbon atoms, by using the hydrogen gas 136 supplied from the hydrogen separator 36 through the WAX fraction hydrocracking reactor 72. As a result, products containing the hydrotreated liquid hydrocarbon are separated into vapor and liquid by the vapor-liquid separator 82, and liquid hydrocarbon among them is supplied to the naphtha stabilizer 86, and the gaseous component is re-used for the hydrotreating reaction.

Next, the second fractionator 84 distills the liquid hydrocarbon supplied from the WAX fraction hydrocracking reactor 72 and the kerosene/gas oil fraction hydrotreating reactor 74 through the vapor-liquid separators 78 and 80 as described above to be fractionated into hydrocarbons (having a boiling point of less than approximately 150° C.) with the number of carbon atoms of $C_{10}$ or less, kerosene (having a boiling point of approximately 150 to 250° C.) 192, gas oil (having a boiling point of approximately 250 to 350° C.) 194, and uncracked WAX fractions (having a boiling point of higher than approximately 350° C.). from the WAX fraction hydrocracking reactor 72. The gas oil 194 and the kerosene 192 are flowed out from the center of the second fractionator 84. The gas oil 194 is stored in the gas oil storage tank 94, and the kerosene 192 is stored in the kerosene storage tank 92. In addition, the hydrocarbon gas with the number of carbon atoms of $C_{10}$ or less is flowed out from the top of the second fractionator 84 to be supplied to the naphtha stabilizer 86.

In the naphtha stabilizer 86, the hydrocarbon with the number of carbon atoms less than or equal to $C_{10}$ supplied from the naphtha fraction hydrotreating reactor 76 and the second fractionator 84 is distilled to be fractionated into naphtha ($C_5$ to $C_{10}$) 190 as products. Accordingly, high-purity naphtha 190 is flowed out from the bottom of the naphtha stabilizer 86 and stored in the naphtha storage tank 90. From the top of the naphtha stabilizer 86, offgas mainly containing the hydrocarbon with the number of carbon atoms of a predetermined number ($C_4$ or less) is exhausted as the upgrading offgas 106. The upgrading offgas 106 is supplied to the fuel gas drum 22 through the pipe 87.

Figure 4:
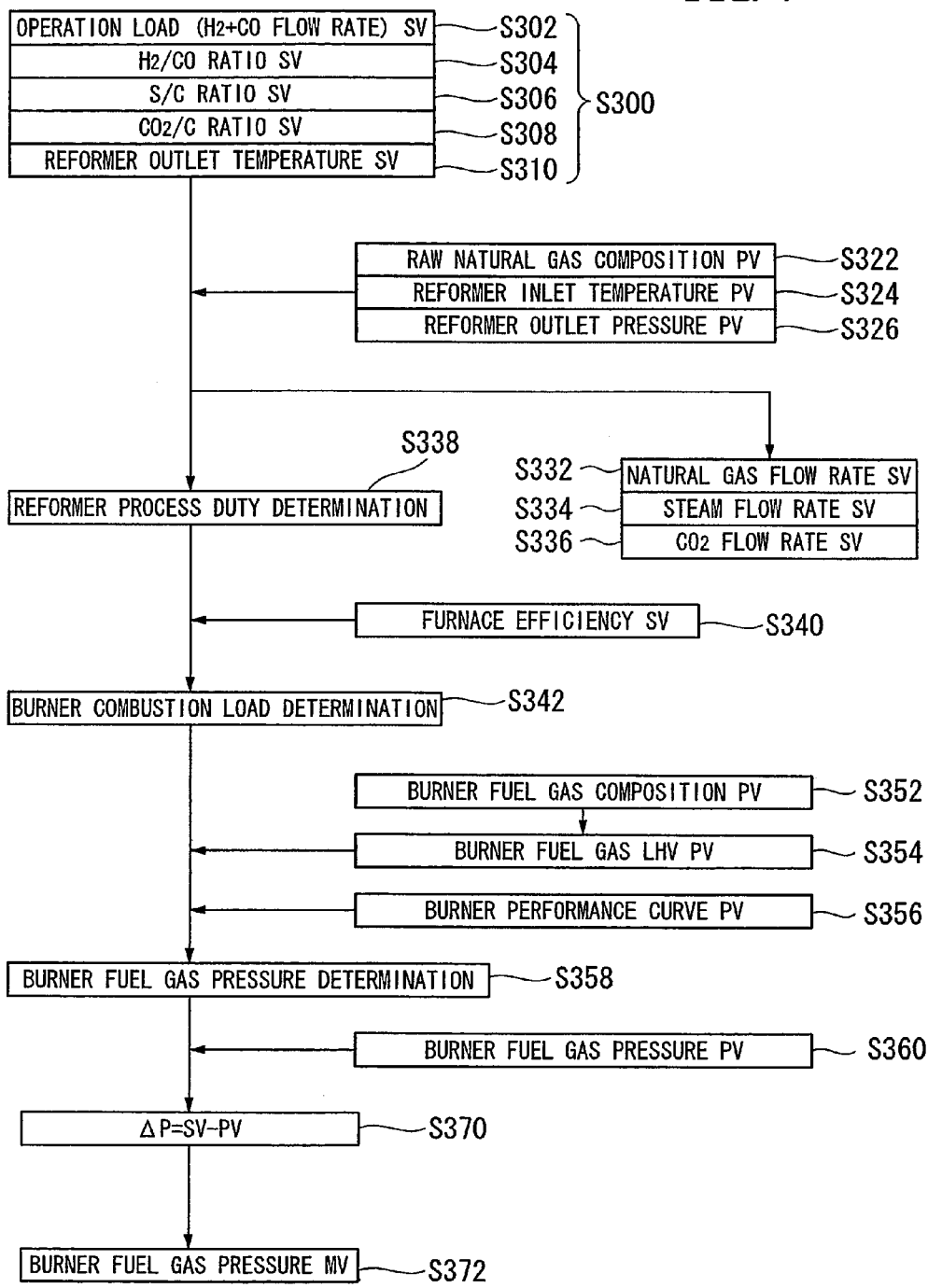
FIG. 4 is a flowchart for explaining a control method of the synthesis gas reformer according to the embodiment of the present invention.
Figure 5:
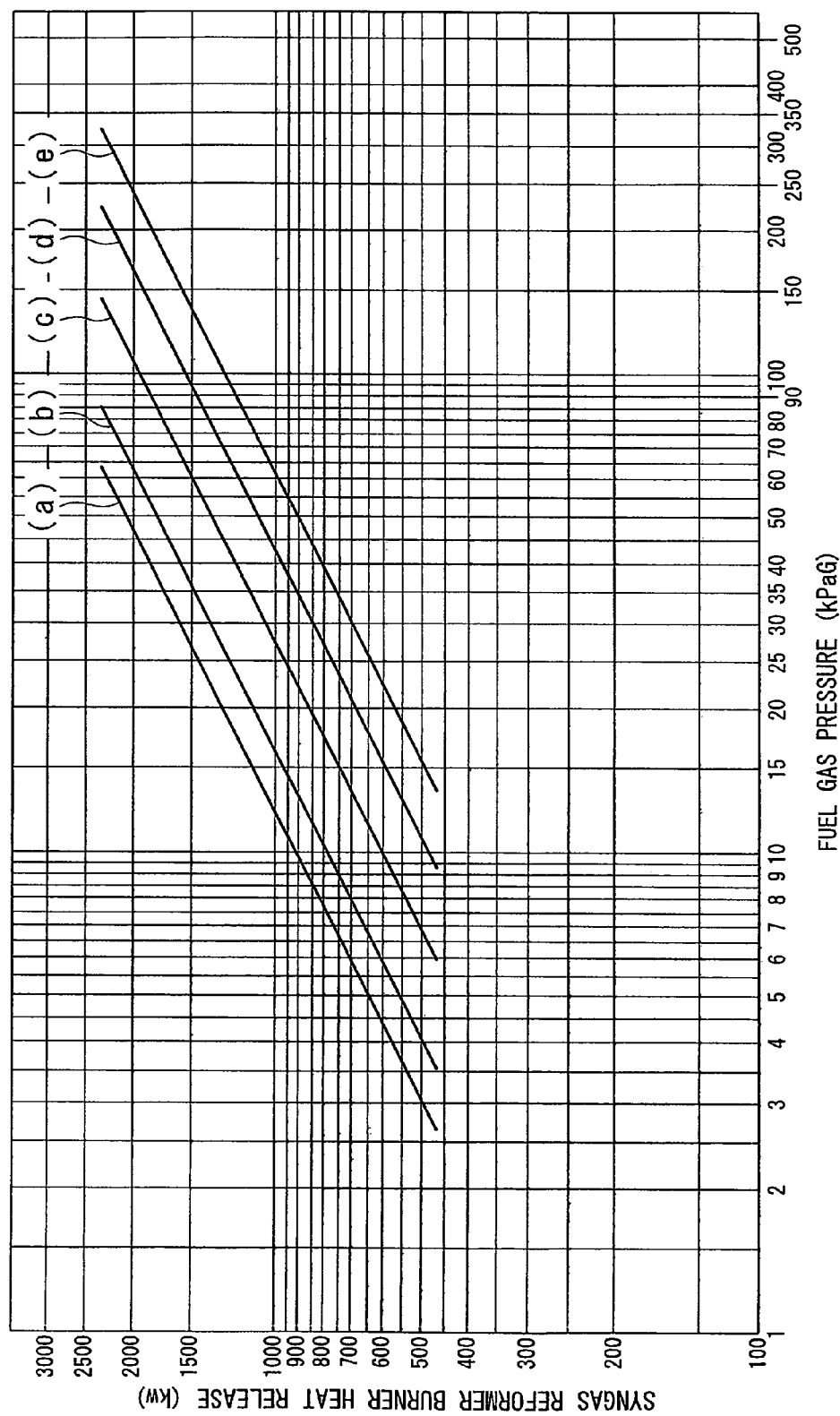
FIG. 5 is a drawing showing a correlation between a burner fuel gas pressure and a burner heat release according to the embodiment of the present invention.

The operation of the synthesis gas reformer 20 is controlled by the method described as follows. An operation method of the synthesis gas reformer 20 will be described with reference to FIGS. 4 and 5. FIG. 4 is a flowchart for explaining an example of a control method of the outlet temperature (synthesis gas temperature) of the synthesis gas reformer 20. FIG. 5 is a drawing showing a burner performance curve representing a relationship between a burner heat release of the synthesis gas reformer and a fuel gas pressure. In addition, in FIG. 4, a reformer indicates the synthesis gas reformer. In addition, SV (set value) denotes a control target value, PV (process value) denotes a measured value, and MV (manipulated value) denotes a controller output.

As shown in FIG. 4, the load of an operation load that is a target value of the total flow rate of $H_2$ and CO produced by the synthesis gas reformer 20 is set in step S302.

A control target value of a $H_2/CO$ ratio represented as the number of moles of $H_2$/the number of moles of CO, of the $H_2$ and the CO produced by the synthesis gas reformer 20, is set in step S304.

A control target value of an S/C ratio represented as the number of moles of steam 116 mixed with the raw natural gas 111/the number of moles of carbon of the raw natural gas 111, is set in step S306.

A control target value of a $CO_2/C$ ratio represented as the number of moles of $CO_2$ gas 112 mixed with the raw natural gas 111/the number of moles of carbon of the raw natural gas 111, is set in step S308.

In addition, a control target value of the outlet temperature of the synthesis gas reformer 20 is set in step S310, and thus the operation condition is set in step S300.

Next, the composition of the natural gas 111 is measured by the composition measuring device 243 in step S322, the inlet temperature of the synthesis gas reformer 20 is measured by the temperature measuring device 240 in step S324, and the outlet pressure of the synthesis gas reformer 20 is measured by the pressure measuring device 215 in step S326.

A control target value of the flow rate of the natural gas 111 is calculated by a material balance in the catalyst tube from the measured values measured in steps S322, S324, and S326 and the operation condition set in step S300, and output to the flow controller 242 in step S332. The flow controller 242 controls the opening degree of the flow control valve 241 on the basis of the output.

A control target value of the flow rate of the steam 116 is calculated by the S/C ratio from the measured values measured in steps S322, S324, and S326 and the operation condition set in step S300, and output to the flow controller 261 in step S334. The flow controller 261 controls the opening degree of the flow control valve 260 on the basis of the output.

A control target value of the flow rate of the $CO_2$ gas 112 is calculated by the $CO_2/C$ ratio from the measured values measured in steps S322, S324, and S326 and the operation condition set in step S300, and output to the flow controller 251 in step S336. The flow controller 251 controls the opening degree of the flow control valve 250 on the basis of the output.

Accordingly, operation load control of the synthesis gas reformer 20 can be performed.

In step S338, a process duty that is an amount of heat needed to produce the synthesis gas by the synthesis gas reformer 20 is calculated by a heat balance in the catalyst tube from the measured values measured in steps S322, S324, and S326 and the operation condition set in step S300. Here, the process duty is an amount of heat needed for reactions in the catalyst tube 202, and in other words, an enthalpy difference between the mixed fluid at the inlet of the synthesis, gas reformer 20 and the synthesis gas 230 at the outlet thereof.

Next, a furnace efficiency is set in step S340, the reformer process duty is modified, and a burner combustion load of the burner 200 is determined in step S342. The burner combustion load can be calculated by the following expression when, the reformer process duty determined in step S338 is xMW (mega watt) and the furnace efficiency is y%, for example, the reformer process duty is 17.017 MW and the SV of the furnace efficiency is 52.0%, a burner combustion load of 32.75 MW can be calculated by the following expression.

$$\text{burner combustion load (MW)} = x/y\% \tag{4}$$

The composition of the fuel gas 122 is measured by a composition measuring device 213 in step S352, and the fuel gas LHV (lower heating value) is calculated in the following expression on the basis of the measured composition of the fuel gas 122 in step S354. A burner performance curve representing a correlation between the burner heat release and the pressure of the fuel gas per LHV is calculated in step S356.

Here, LHV means a heating value excluding heat energy (latent heat) for converting water (liquid) into steam (vapor).

$$LHV = \sum_i HC_i \times Y_i, \tag{5}$$

where i denotes each component of the fuel gas, HCi denotes the lower heating value of the i component, and Yi denotes a molal fraction of the i component.

Next, in step S358, by applying the burner combustion load determined in step S342, that is, the heat release of the burner 200 to supply the reformer process duty, and the LHV of the burner fuel gas calculated in step S354 to the burner performance curve calculated in step S356, a control target value (SV) of the burner fuel gas pressure is determined.

The SV of the burner fuel gas pressure in step S358 can be determined, for example, by using the burner performance curve illustrated in FIG. 5. In FIG. 5, the vertical axis stands for the heat release per each burner 200 of the synthesis gas reformer 20, and the horizontal axis stands for the pressure of the fuel gas 122, thereby representing the correlation between the heat release of the burner 200 and the pressure of the fuel gas 122. The legend (a) represents the burner performance when LHV=39700 kJ/Nm³, the legend (b) represents the burner performance when LHV=33600 kJ/Nm³, the legend (c) represents the burner performance when LHV=25000 kJ/Nm³, the legend (d) represents the burner performance when LHV=17900 kJ/Nm³, and the legend (e) represents the burner performance when LHV=13600 kJ/Nm³. In addition, "Nm³" represents "m³ (standard state)" (same in the following description).

A graph showing a relationship between the heat release of the burner 200 corresponding to the LHV of the burner fuel gas calculated in step S354 and the pressure of the fuel gas 122 is selected. By applying the value of the burner combustion load determined in step S342 as the heat release per each burner 200, the corresponding pressure of the fuel gas 122 can be determined.

Next, the pressure of the fuel gas 122 of the synthesis gas reformer 20 is measured by the pressure measuring device 210 thereby measuring a measured value (PV) of the fuel gas pressure in step S360. Thereafter, in step S370, a difference ΔP between the SV of the fuel gas pressure determined in step S358 and the fuel gas pressure PV measured in step S360 is calculated. On the basis of the ΔP calculated in step S370, control output from the operation control system 218 for the pressure controller 212 is performed to compensate for the ΔP in step S372.

The pressure controller 212 determines the opening degree of the pressure control valve 214 on the basis of the control output, and adjusts the opening degree of the pressure control valve 214.

In addition, the temperature measuring device 216 measures the temperature of the synthesis gas 230 of the outlet of the synthesis gas reformer 20, and the measured temperature is used to adjust the proportion of change in pressure of the fuel gas 111 so as not to allow the outlet temperature of the synthesis gas reformer 20 to deviate from a prescribed range.

The outlet temperature of the synthesis gas reformer 20 may be determined in consideration of fractions or quantities of petroleum products as end products, and more preferably, determined in the range of, for example, 850 to 950° C. When the temperature is less than the lower limit of the range, the conversion is low, so that the number of the catalyst tubes 202 has to be increased. When the temperature is higher than the upper limit of the range, the material of the catalyst tube must be of a higher grade. In either case, economic efficiency is low.

The $H_2/CO$ ratio SV is set to be in the range of 1.90 to 2.10 according to the demand of the FT section 40. Otherwise the range, problems in the FT reaction such as reduction in conversion, abnormality in product distribution, and catalyst deterioration occur.

The S/C ratio SV is set to be in the range of 0.9 to 2.0. When the S/C is less than 0.9, carbon is precipitated to the catalyst of the synthesis gas reformer 20, and this may cause difficulties in operation. When the SV is higher than 2.0, heat efficiency of the synthesis gas reformer 20 decreases, and it is economically disadvantageous.

The furnace efficiency may be determined depending on the type or capacity of the synthesis gas reformer 20, and may be set to be in the range of, for example, 50 to 60%.

As described above, according to the operation method of the synthesis gas reformer of the invention, the amount of heat needed for the synthesis gas reformer is calculated as needed, and control of the fuel gas pressure according to an amount of fuel gas needed for the heat release can be performed. As a result, corresponding to the change in composition of the fuel gas, change in operation load, variation in operation condition of the synthesis gas reformer, change in operation condition of the bubble column reactor, and change in operation condition of the upgrading section, a proper amount of heat can be provided to the synthesis gas reformer. In addition, by precisely controlling the synthesis gas temperature of the outlet of the synthesis gas reformer, the composition of the synthesis gas can be controlled, and stabilization of the fraction and quality of the petroleum products can be achieved.

Figure 6:
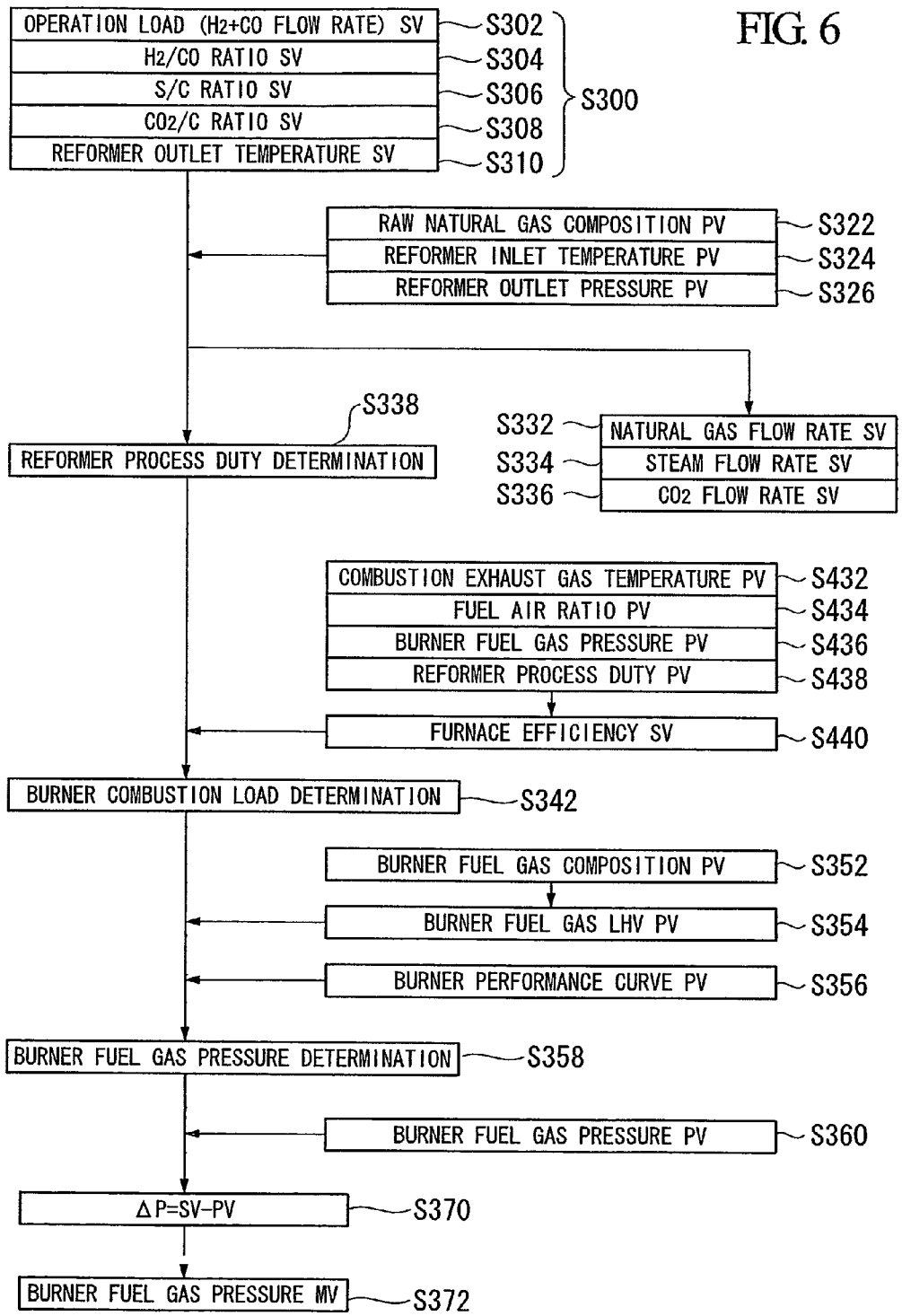
FIG. 6 is a flowchart for explaining a control method of the synthesis gas reformer according to the embodiment of the present invention.

In the embodiment described above, an arbitrary furnace efficiency is set in step S340. However, for example, the furnace efficiency may also be set as follows. A method of setting the furnace efficiency is described with reference to FIG. 6. FIG. 6 is a flowchart for explaining an example of a control method of the outlet temperature (synthesis gas temperature) of the synthesis gas reformer 20. Here, a reformer in FIG. 6 indicates the synthesis gas reformer. In addition, SV (set value) denotes a control target value, PV (process value) denotes a measured value, and MV (manipulated value) denotes a control output.

The temperature of combustion exhaust gas 232 (FIG. 2) of the synthesis gas reformer 20 is measured in step S432. By measuring the flow rate of combustion air 220 and the fuel gas 122 supplied to the burner 200, a fuel-air ratio represented as the number of moles of the combustion air 220/the number of moles of the fuel gas 122 is measured in step S434. The pressure of the fuel gas 122 is measured by the pressure measuring device 210 in step S436. For an output of the pressure control of the fuel gas 122 performed during a control period in the former cycle, a value of the reformer process duty determined in step S338 is input as a current value (PV) in step S438. For example, when outputting and controlling as in step S372 are performed every second, the reformer process duty determined in step S338 before one second is input. In addition, when the heat release of the burner calculated from the temperature of the combustion exhaust gas 232, the combustion air ratio, and the pressure of the fuel gas 122 is denoted by pMW, and the value of the reformer process duty input in step S438 is denoted by qMW, the furnace efficiency PV is determined as the following expression in step S440. For example, when the required burner heat release is 33.3 MW, and the reformer process duty input in step S438 is 17.0 MW, a furnace efficiency of PV=51.05% is calculated by the following expression.

$$\text{Furnace efficiency } PV = p/q \quad (6)$$

The combustion load of the burner 200 can be determined from the furnace efficiency PV determined as described above and the reformer process duty set in step S338.

EXAMPLES

Hereinafter, Examples of the invention will be described in detail, and the invention is should not be considered as limited by the Examples.

By using a pilot plant having the process configuration illustrated in FIG. 1 and a capacity of 527 BPD (83.8 m³/day, BPD denotes barrel per day that is a daily production) as a GTL product, experiments on control of normal operation load/outlet temperature of a synthesis gas reformer and changes in operation load were performed.

In addition, the GTL product 527 BPD includes naphtha 163 BPD (25.9 m³/day), kerosene 208 BPD (33.07 m³/day), and gas oil 156 BPD (24.8 m³/day). In addition, the GTL product 527 BPD corresponds to $H_2+CO=17030$ Nm³/h as the synthesis gas. The synthesis gas reformer has 48 catalyst tubes and 24 burners.

Example 1

Experiment 1 on Control of Normal Operation Load and Outlet Temperature of the Synthesis Gas Reformer According to the method of the invention, an operation load of SV=100% ($H_2+CO=17030$ Nm³/h), a $H_2$/CO ratio of SV=2.015, a S/C (steam/carbon) ratio of SV=1.086, a $CO_2$/C($CO_2$/carbon) ratio of SV=0.42, and an outlet temperature of the synthesis gas reformer of SV=890° C., were set.

Next, by measuring, the number of moles of carbon and the number of moles of hydrogen in the natural gas as the raw natural gas composition PV by on-line gas chromatography, and by using the mixed fluid temperature PV of the inlet of the synthesis gas reformer and the outlet pressure PV of the synthesis gas reformer, an experiment on control of the operation load (raw natural gas flow rate, steam flow rate, and $CO_2$ flow rate) of the synthesis gas reformer was performed. The results are shown in Table 1. In addition, the value of each flow rate in Table 1 is represented as an average over an hour (3600 points), and a fluctuation range thereof is represented by a standard deviation.

Next, the burner combustion load was calculated from the reformer process duty calculated by the heat balance in the catalyst tube and the set furnace efficiency of 52.0%. A burner fuel gas composition PV was measured by the on-line gas chromatography, and a burner fuel gas LHV was calculated from the burner fuel gas composition PV. A burner fuel gas pressure was determined by using the calculated burner fuel gas LHV and the burner performance curve (FIG. 5) that is numerically modeled. Here, variables related to the temperature control of the outlet of the synthesis gas reformer are shown in Table 1. In addition, each variable is represented as an average over an hour (3600 points).

By control-outputting the determined burner fuel gas pressure to the pressure controller, the operation of the synthesis gas reformer was performed. Results of control of the normal operation load and the outlet temperature of the synthesis gas reformer are shown in Table 1. In addition, a $H_2+CO$ production (Nm³/h), a $H_2$/CO ratio, and the outlet temperature (° C.) of the synthesis gas reformer are each represented as an average over an hour (3600 points), and a fluctuation range thereof is represented by a standard deviation.

Example 2

Experiment 2 on Control of Normal Operation Load and Outlet Temperature of the Synthesis Gas Reformer Except for setting the S/C ratio to SV=1.098, the outlet temperature of the synthesis gas reformer to SV=900° C., and the furnace efficiency to 51.4%, an experiment on control of the normal operation load and the outlet temperature of the synthesis gas reformer was performed under the same conditions as Example 1, and the results are shown in Table 1.

Example 3

Experiment 3 on Control of Normal Operation Load and Outlet Temperature of the Synthesis Gas Reformer Except for setting the S/C ratio to SV=1.110, the outlet temperature of the synthesis gas reformer to SV=910° C., and the furnace efficiency to 50.9%, an experiment on control of the normal operation load and the outlet temperature of the synthesis gas reformer was performed under the same conditions as Example 1, and the results are shown in Table 1.

A start operation of the GTL plant is performed in an order of the synthesis gas section, the FT section, and the upgrading section. This configuration is implemented such that initially, the process of the synthesis gas section is started, and while a partial load (50 to 60%) is maintained on standby, the processes of the downstream FT section and the upgrading section are started. In addition, as the fuel gas of the synthesis gas reformer in this case, the hydrogen-separator offgas and the natural gas are supplied. Even during the standby operation of the synthesis gas section, precise control of the operation load and the outlet temperature of the synthesis gas reformer is required. In the embodiment, the experiment on control of the operation load and the outlet temperature in consideration of the standby operation of the synthesis gas reformer was performed.

Example 4

Experiment 1 on Control of Standby Operation Load and Outlet Temperature of the Synthesis Gas Reformer

SV=50% ($H_2$+CO=8515 $Nm^3/h$), a $H_2$/CO ratio of SV=2.015, a S/C ratio of SV=1.086, a $CO_2$/C ratio of SV=0.42, and the outlet temperature of the synthesis gas reformer of SV=890° C. were set.

Next, by measuring as the raw natural gas composition PV, the number of moles of carbon and the number of moles of hydrogen in the natural gas by on-line gas chromatography, and by using the mixed fluid temperature PV of the inlet of the synthesis gas reformer and the outlet pressure PV of the synthesis gas reformer, an experiment on control of the operation load (raw natural gas flow rate, steam flow rate, and $CO_2$ flow rate) of the synthesis gas reformer was performed. The results are shown in Table 2. In addition, the value of each flow rate in Table 2 is represented as an average over an hour (3600 points), and a fluctuation range thereof is represented by a standard deviation.

Next, the burner combustion load was calculated from the reformer process duty calculated by the heat balance in the catalyst tube and the set furnace efficiency of 49.1%. A burner fuel gas composition PV was measured by the on-line gas chromatography, and a burner fuel gas LHV was calculated from the burner fuel gas composition PV. A burner fuel gas pressure was determined by using the calculated burner fuel gas LHV and the burner performance curve (FIG. 5) that is numerically modeled. Here, variables related to the temperature control of the outlet of the synthesis gas reformer are shown in Table 2. In addition, each variable is represented as an average over an hour (3600 points).

By control-outputting the determined burner fuel gas pressure to the pressure control device, the operation of the synthesis gas reformer was performed. The results of the control of the normal operation load and the outlet temperature of the synthesis gas reformer are shown in Table 2. In addition, a $H_2$+CO production ($Nm^3/h$), a $H_2$/CO ratio, and the outlet temperature (° C.) of the synthesis gas reformer are each represented as an average over an hour (3600 points), and a fluctuation range thereof is represented by a standard deviation.

Example 5

Experiment 2 on Control of Standby Operation Load and Outlet Temperature of the Synthesis Gas Reformer

Except for setting the S/C ratio to SV=1.098, the outlet temperature of the synthesis gas reformer to SV=900° C., and the furnace efficiency to 48.6%, an experiment on control of the standby operation load and the outlet temperature of the synthesis gas reformer was performed under the same conditions as Example 4, and the results are shown in Table 2.

Example 6

Experiment 3 on Control of Standby Operation Load and Outlet Temperature of the Synthesis Gas Reformer

Except for setting the S/C ratio to SV=1.110, the outlet temperature of the synthesis gas reformer to SV=910° C., and the furnace efficiency to 48.0%, an experiment on control of the standby operation load and the outlet temperature of the synthesis gas reformer was performed under the same conditions as Example 4, and the results are shown in Table 2.

TABLE 1

|  |  | Example 1 | Example 2 | Example 3 |
|---|---|---|---|---|
| Synthesis gas Reformer Operation Load (%) SV |  |  | 100 |  |
| 100% = $H_2$ + CO: 17,030 $Nm^3/h$ |  |  |  |  |
| Synthesis gas Reformer Outlet Temperature SV | (° C.) | 890 | 900 | 910 |
| Natural Gas Composition PV | (atom/mole) | C(1.152) | C(1.152) | C(1.152) |
|  |  | H(4.304) | H(4.304) | H(4.304) |
| Synthesis gas $H_2$/CO Ratio SV | (—) | 2.015 | 2.015 | 2.015 |
| S/C Ratio | (—) | 1.086 | 1.098 | 1.11 |
| $CO_2$/C Ratio | (—) | 0.42 | 0.42 | 0.42 |
| Synthesis gas Reformer Inlet Temperature PV | (° C.) | 520 | 520 | 520 |
| Synthesis gas Reformer Outlet Pressure PV | (kPaG) | 1961 | 1961 | 1961 |
| Natural Gas Flow Rate/Standard Deviation | ($Nm^3/h$) | 5677/7.4 | 5477/7.1 | 5298/6.9 |
| Steam Flow Rate/Standard Deviation | ($Nm^3/h$) | 7100/11.0 | 6930/10.7 | 6775/10.5 |
| $CO_2$ Flow Rate/Standard Deviation | ($Nm^3/h$) | 2747/11.2 | 2650/10.8 | 2564/10.5 |
| Reformer Process Duty | (KW) | 17017 | 17003 | 16995 |
| Furnace Efficiency | (%) | 52 | 51.4 | 50.9 |
| Burner Combustion Load | (KW) | 32753 | 33059 | 33386 |
| The Number of Burners | (number) | 24 | 24 | 24 |
| Combustion Load Per Each Burner | (KW/number) | 1364.7 | 1377.5 | 1391.1 |
| Synthesis gas Reformer Fuel Gas PV |  |  |  |  |
| Natural Gas PV | ($Nm^3/h$) | 79 | 306 | 515 |
| Hydrogen-Separator Offgas PV | ($Nm^3/h$) | 452 | 437 | 423 |
| FT Offgas PV | ($Nm^3/h$) | 4116 | 3905 | 3715 |
| Upgrading Offgas PV | ($Nm^3/h$) | 219 | 219 | 219 |
| Synthesis gas Reformer Fuel Gas LHV | ($kJ/Nm^3$) | 25368 | 25592 | 25805 |
| Synthesis gas Reformer Fuel Gas Pressure | (kPaG) | 48.56 | 48.76 | 50.35 |
| Synthesis gas Reformer Outlet Temperature | (° C.) | 890.1 | 900.1 | 909.9 |
| Synthesis gas Reformer Outlet Temperature Standard Deviation | (° C.) | 0.22 | 0.23 | 0.23 |
| $H_2$ + CO Flow Rate | ($Nm^3/h$) | 17050 | 17030 | 17010 |
| $H_2$ + CO Flow Rate Standard Deviation | ($Nm^3/h$) | 24.2 | 24.2 | 24.2 |

TABLE 1-continued

|  |  | Example 1 | Example 2 | Example 3 |
|---|---|---|---|---|
| $H_2$/CO Ratio | (—) | 2.013 | 2.015 | 2.017 |
| $H_2$/CO Ratio Standard Deviation | (—) | 0.0023 | 0.0023 | 0.0023 |

TABLE 2

|  |  | Example 4 | Example 5 | Example 6 |
|---|---|---|---|---|
| Synthesis gas Reformer Operation Load (%) SV $100\% = H_2 + CO: 17{,}030\ Nm^3/h$ |  |  | 50 |  |
| Synthesis gas Reformer Outlet Temperature SV | (° C.) | 890 | 900 | 910 |
| Natural Gas Composition PV | (atom/mole) | C(1.152) | C(1.152) | C(1.152) |
|  |  | H(4.304) | H(4.304) | H(4.304) |
| Synthesis gas $H_2$/CO Ratio SV | (—) | 2.015 | 2.015 | 2.015 |
| S/C Ratio | (—) | 1.086 | 1.098 | 1.11 |
| $CO_2$/C Ratio | (—) | 0.42 | 0.42 | 0.42 |
| Synthesis gas Reformer Inlet Temperature PV | (° C.) | 520 | 520 | 520 |
| Synthesis gas Reformer Outlet Pressure PV | (kPaG) | 1961 | 1961 | 1961 |
| Natural Gas Flow Rate/Standard Deviation | ($Nm^3/h$) | 2761/3.6 | 2664/3.5 | 2577/3.5 |
| Steam Flow Rate/Standard Deviation | ($Nm^3/h$) | 3453/5.3 | 3371/5.2 | 3295/5.1 |
| $CO_2$ Flow Rate/Standard Deviation | ($Nm^3/h$) | 1336/5.4 | 1289/5.3 | 1247/5.1 |
| Reformer Process Duty | (KW) | 8277 | 8270 | 8266 |
| Furnace Efficiency | (%) | 49.1 | 48.6 | 48 |
| Burner Combustion Load | (KW) | 16848 | 17023 | 17207 |
| The Number of Burners | (number) | 24 | 24 | 24 |
| Combustion Load Per Each Burner | (KW/number) | 702 | 709.3 | 717 |
| Synthesis gas Reformer Fuel Gas PV |  |  |  |  |
| Natural Gas PV | ($Nm^3/h$) | 1483 | 1501 | 1520 |
| Hydrogen-Separator Offgas PV | ($Nm^3/h$) | 80 | 76 | 72 |
| FT Offgas PV | ($Nm^3/h$) | 0 | 0 | 0 |
| Upgrading Offgas PV | ($Nm^3/h$) | 0 | 0 | 0 |
| Synthesis gas Reformer Fuel Gas LHV | ($kJ/Nm^3$) | 38795 | 38854 | 38908 |
| Synthesis gas Reformer Fuel Gas Pressure | (kPaG) | 6.06 | 6.19 | 6.39 |
| Synthesis gas Reformer Outlet Temperature | (° C.) | 890.3 | 900.3 | 909.7 |
| Synthesis gas Reformer Outlet Temperature Standard Deviation | (° C.) | 0.22 | 0.23 | 0.23 |
| $H_2$ + CO Flow Rate | ($Nm^3/h$) | 8525 | 8515 | 8505 |
| $H_2$ + CO Flow Rate Standard Deviation | ($Nm^3/h$) | 12.1 | 12.1 | 12.1 |
| $H_2$/CO Ratio | (—) | 2.013 | 2.015 | 2.017 |
| $H_2$/CO Ratio Standard Deviation | (—) | 0.0023 | 0.0023 | 0.0023 |

As shown in Table 1 and 2, during the control of the outlet temperature of the synthesis gas reformer, in Examples 1 to 6, the difference between the outlet temperature SV of the synthesis gas reformer and the outlet temperature PV of the synthesis gas reformer was less than or equal to 0.3° C. Particularly, in Examples 1 to 3, the difference was less than or equal to 0.1° C. In addition, in all of Examples 1 to 6, the results showed that the standard deviation of the outlet temperature PV of the synthesis gas reformer was less than or equal to 0.23, and this means that highly precise control was implemented.

The operation load represented as the $H_2$+CO flow rate PV and the $H_2$/CO ratio PV achieved values approximate to the $H_2$+CO flow rate SV (17030 $Nm^3/h$) and the $H_2$/CO ratio SV (2.015) of the 100% operation load, respectively, and it can be seen from the standard deviation that the fluctuation during the operation of the synthesis gas reformer was extremely small.

When the operation of the GTL plant is started or stopped, or when a production is changed, the operation load of each section of the plant is changed.

When the operation load is changed, an operation is required, which is rapid from an economic point of view and does not affect the property of products. In addition, for the synthesis gas reformer, stably maintaining the outlet temperature of the synthesis gas reformer and the $H_2$/CO ratio in the synthesis gas during the changing of the operation load is strongly required.

In this point of view, on the GTL pilot plant the same as in Examples 1 to 6, two types of operation load change (load-up and load-down) experiments were performed. In addition, for the operation load SV=100% of the synthesis gas reformer of the pilot plant, the flow rate of $H_2$+CO is 17030 $Nm^3/h$.

Example 7

Load Change Experiment: Load-Up

The operation load is raised from 90% to 100% over 50 minutes. By a Ramp operation (of changing the SV (control target value) at a predetermined speed) of controllers, supply amounts of the natural gas, steam, and $CO_2$ were increased at a speed of 0.2 point/minute. The outlet temperature SV of the synthesis gas reformer was set to 900° C.

In addition, during the experiment, the FT and the upgrading section of the synthesis gas section downstream were each on standby at the operation load of 90%, and the following conditions were maintained at constant.

mixed fluid temperature of the inlet of the synthesis gas reformer: 520° C.

outlet pressure of the synthesis gas reformer: 1961 kPaG

S/C ratio: 1.098

$CO_2$/C ratio: 0.42

Figure 7:
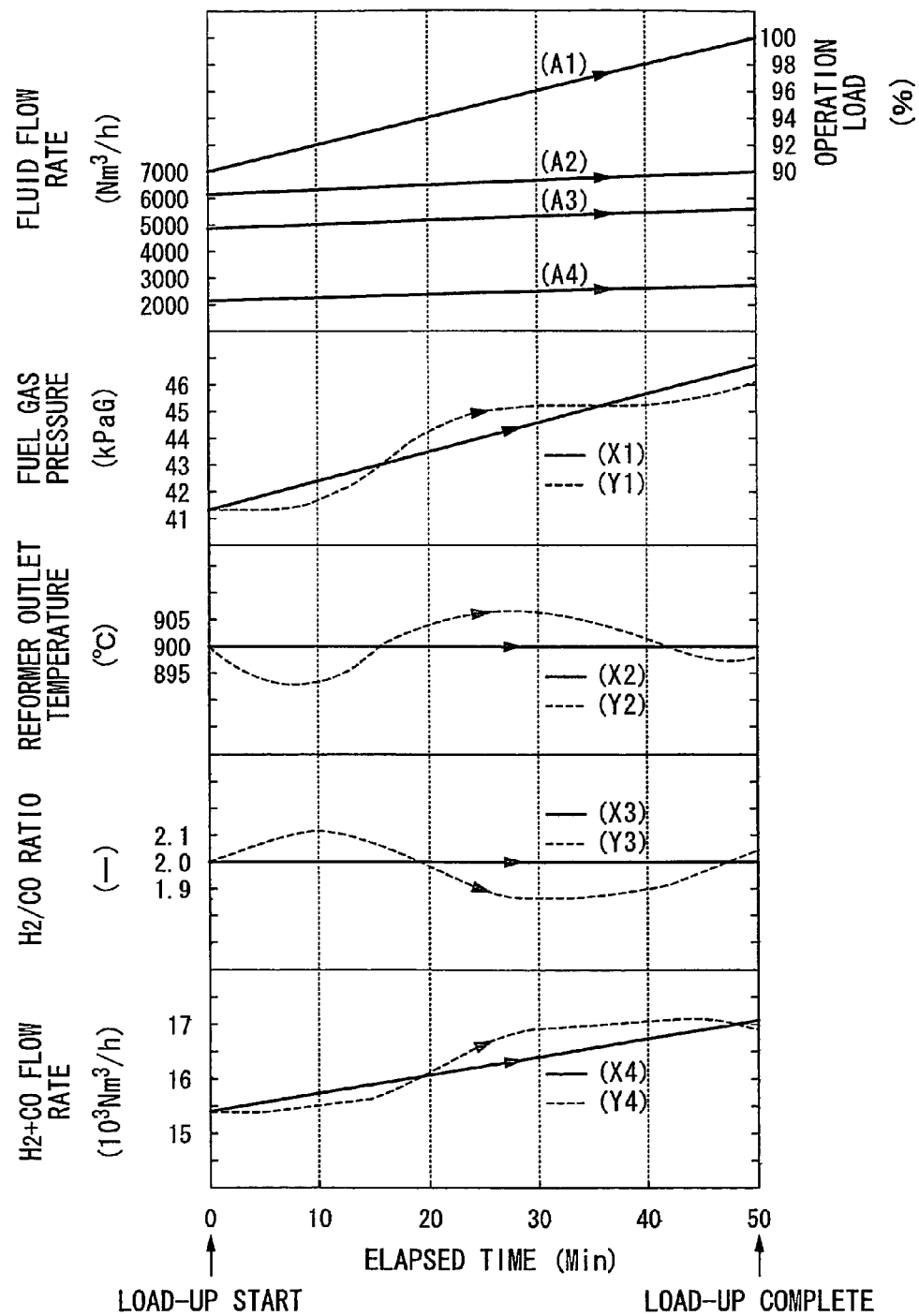
FIG. 7 is a drawing showing results of an experiment of raising up the load of the synthesis gas reformer from 90% to 100%.

The results of Example 7 are shown in FIG. 7.

Comparative Example 1

Load Change Experiment: Load-Up

Figure 10:
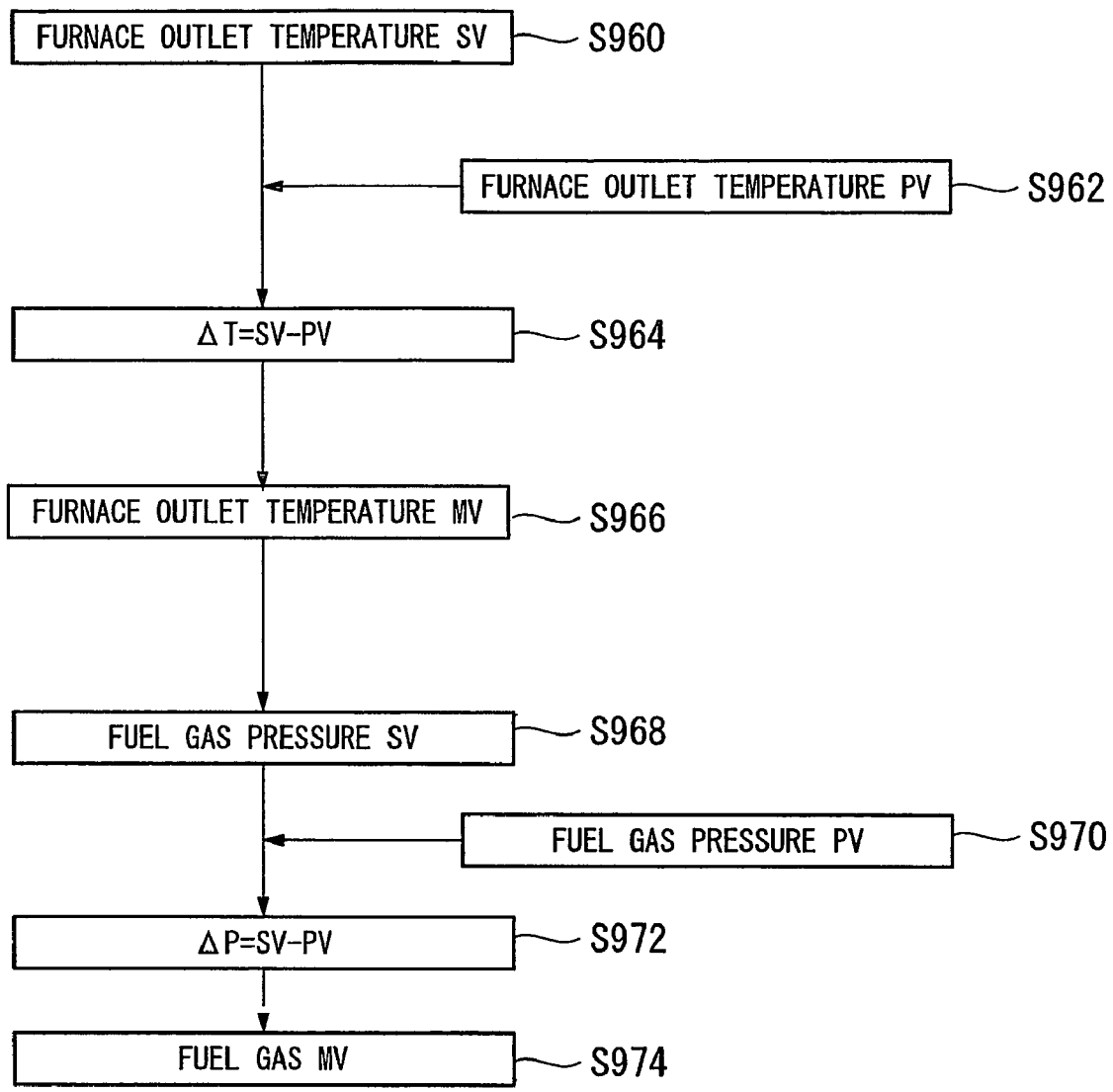
FIG. 10 is a flowchart for explaining a conventional temperature control method of a furnace.

On the basis of the flowchart illustrated in FIG. 10, except for performing control of the outlet temperature of the synthesis gas reformer by the conventional TC (temperature control)/PC (pressure control) cascade control method, under the same conditions as Example 7, the operation of the GTL pilot plant was performed. The results of Comparative Example 1 are shown in FIG. 7.

Example 8

Load Change Experiment: Load-Down

The operation load is lowered from 90% to 80% for 50 minutes. By the Ramp operation (of changing the SV (control target value) at predetermined speed) of the controllers, supply amounts of the natural gas, steam, and $CO_2$ were decreased at a speed of 0.2 point/minute. The outlet temperature SV of the synthesis gas reformer was set to 900° C.

In addition, during the experiment, the FT and the upgrading section of the synthesis gas section downstream were each on standby at the operation load of 80%, and the following conditions were maintained at constant.

mixed fluid temperature of the inlet of the synthesis gas reformer: 520° C.
outlet pressure of the synthesis gas reformer: 1961 kPaG
S/C ratio: 1.098
$CO_2$/C ratio: 0.42

Figure 8:
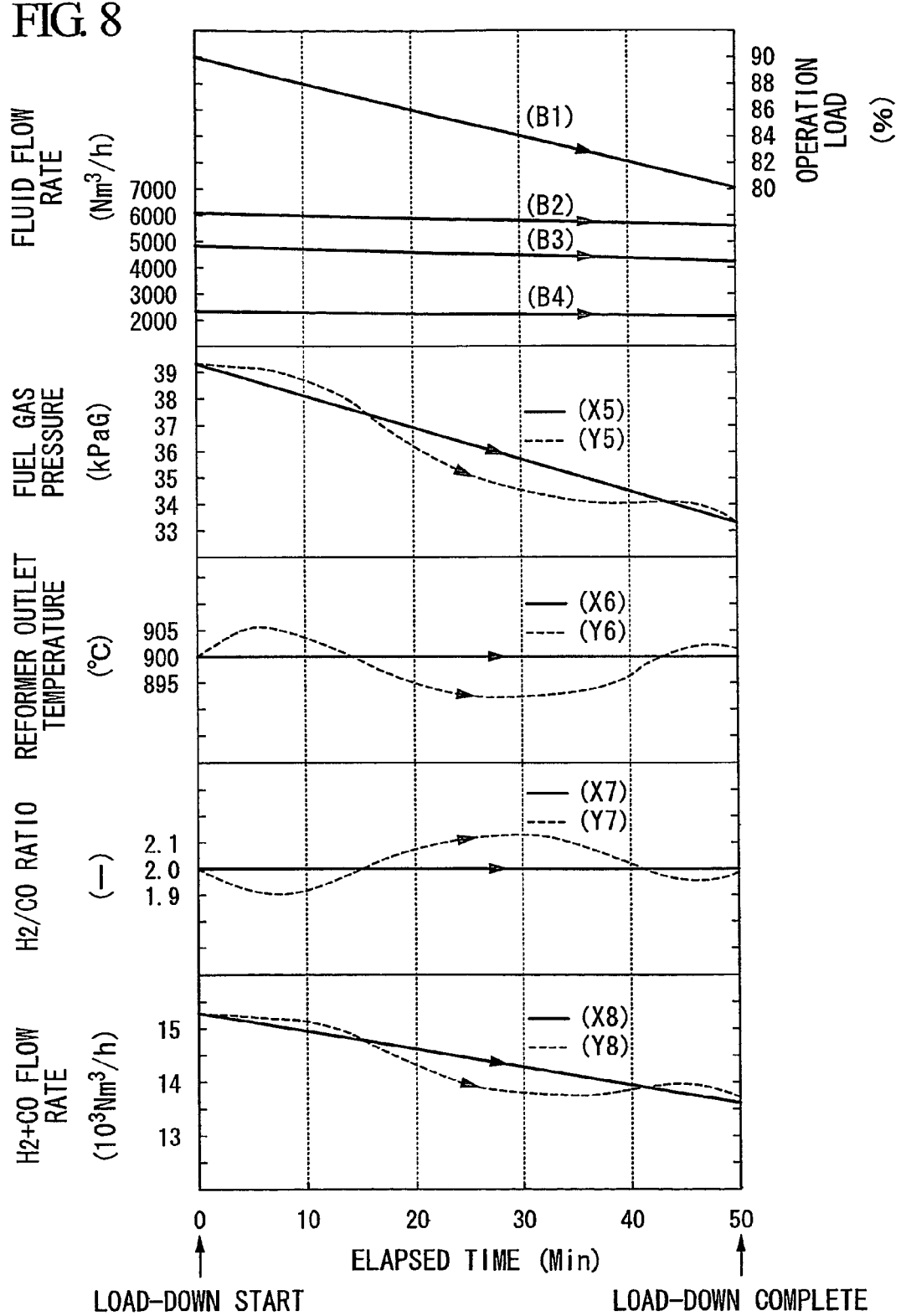
FIG. 8 is a drawing showing results of an experiment of lowering down the load of the synthesis gas reformer from 90% to 80%.
Figure 9:
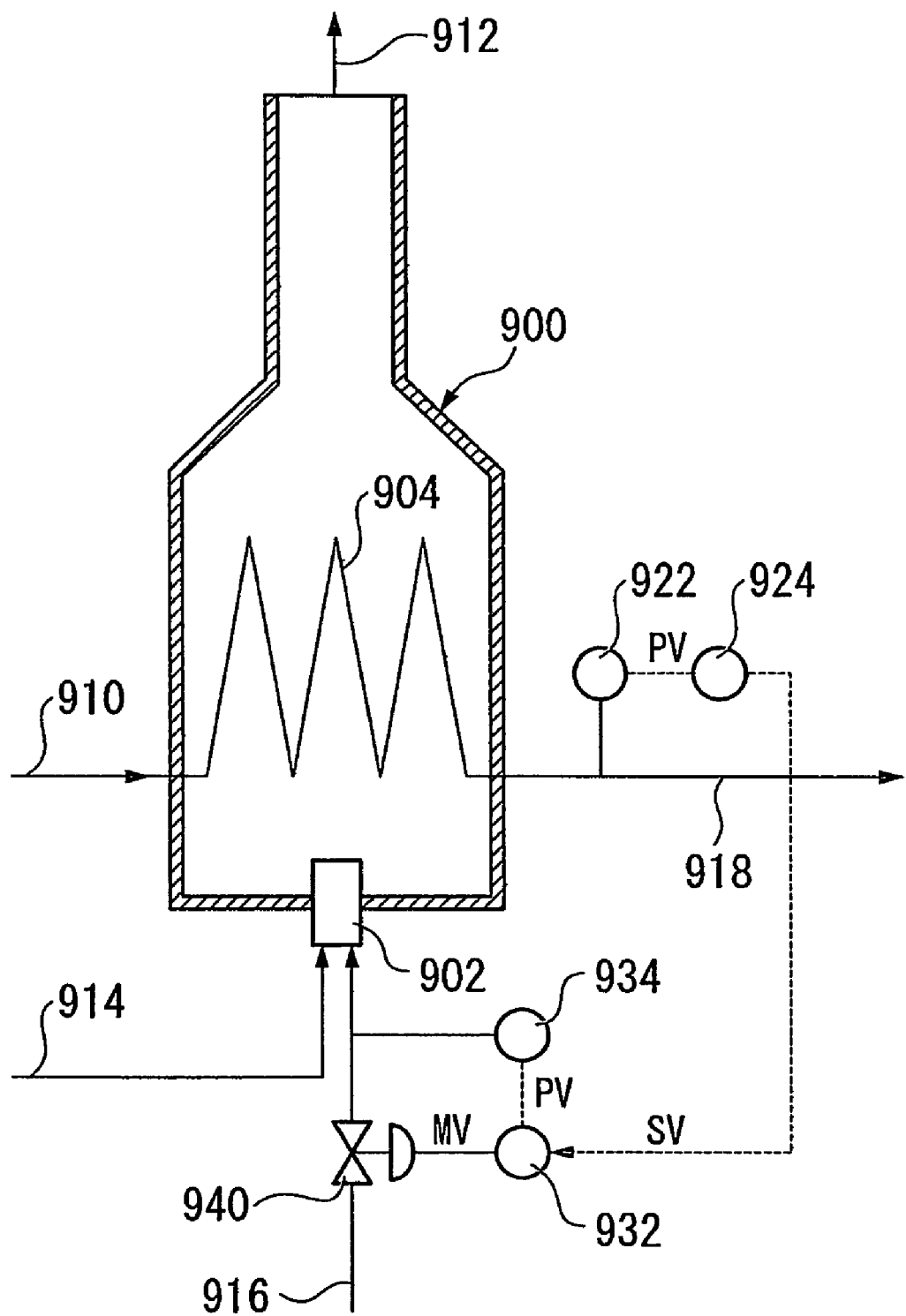
FIG. 9 is a schematic view of a furnace for explaining a conventional temperature control method.

The results of Example 8 are shown in FIG. 8.

Comparative Example 2

Load Change Experiment: Load-Down

On the basis of the flowchart illustrated in FIG. 10, except for performing control of the outlet temperature of the synthesis gas reformer by the conventional TC/PC cascade control method, under the same conditions as Example 8, the operation of the GTL pilot plant was performed. The results of Comparative Example 2 are shown in FIG. 8.

FIG. 7 is a graph showing, during the load-up for 50 minutes, a change in the operation load (A1), a change in flow rate of steam (A2), natural gas (A3), and $CO_2$ (A4), a change in fuel gas pressure of Example 7 (X1) and Comparative Example 1 (Y1), a change in outlet temperature of the synthesis gas reformer of Example 7 (X2) and Comparative Example 1 (Y2), a change in $H_2$/CO ratio of Example 7 (X3) and Comparative Example 1 (Y3), and a change in $H_2$+CO flow rate of Example 7 (X4) and Comparative Example 1 (Y4).

As illustrated in FIG. 7, in Example 7 in which the control method of the operation load and the outlet temperature of the synthesis gas reformer of the invention was performed, as the operation load is raised from 90% to 100%, the pressure of the fuel gas is linearly increased (41.37 to 46.62 kPaG), and the outlet temperature of the synthesis gas reformer was maintained stably (900±1.0° C.).

Accordingly, it can be seen that the $H_2$/CO ratio in the synthesis gas substantially maintains a predetermined value (2.015±0.02), and the $H_2$+CO flow rate is smoothly increased from 90% (15327 $Nm^3$/h) to 100% (17030 $Nm^3$/h). In addition, it can be seen that in only 50 minutes, the load-up of 10% can be performed while maintaining the outlet temperature of the synthesis gas reformer stably.

In Comparative Example 1 representing the conventional method, when increasing the operation load is started, increasing the pressure of the fuel gas is delayed due to a delay in the response of feedback control, and the outlet temperature of the synthesis gas reformer rapidly decreases. In order to compensate for the delay, in the next step, the fuel gas pressure rapidly increases, and accordingly the outlet temperature of the synthesis gas reformer rapidly increases and exceeds a target value (a phenomenon called overshoot). In addition, it can be seen that the $H_2$/CO ratio in the synthesis gas and the $H_2$+CO flow rate showed behaviors biased to considerable extends from their respective target values while the operation load is raised from 90% to 100%.

In the conventional method of Comparative Example 1, due to the factors such as the magnitude of thermal capacity of the catalyst tube, the retention of the fluid in the catalyst tube, the thermal capacity from the outlet of the catalyst tube to a measured point of the outlet temperature of the synthesis gas reformer, the delay of the response of control and overshoot could not be avoided. Therefore, it is evident that the conventional method cannot be applied to the operation load-up control of the synthesis gas reformer.

FIG. 8 is a graph showing, during the load down for 50 minutes, a change in the operation load (B1), a change in flow rate of steam (B2), natural gas (B3), and $CO_2$ (B4), a change in fuel gas pressure of Example 8 (X5) and Comparative Example 2 (Y5), a change in outlet temperature of the synthesis gas reformer of Example 8 (X6) and Comparative Example 2 (Y6), a change in $H_2$/CO ratio of Example 8 (X7) and Comparative Example 2 (Y7), and a change in $H_2$+CO flow rate of Example 8 (X8) and Comparative Example 2 (Y8).

As illustrated in FIG. 8, in Example 8 in which the control method of the operation load and the outlet temperature of the synthesis gas reformer of the invention was performed, as the operation load is lowered from 90% to 80%, the pressure of the fuel gas is linearly decreased (39.44 to 33.18 kPaG), and the outlet temperature of the synthesis gas reformer was maintained stably (900±1.0° C.).

Accordingly, it can be seen that the $H_2$/CO ratio in the synthesis gas substantially maintains a predetermined value (2.015±0.02), and the $H_2$+CO flow rate is smoothly decreased from 90% (15327 $Nm^3$/h) to 80% (13624 $Nm^3$/h). In addition, it can be seen that for a short time of 50 minutes, the load-down of 10% can be performed while maintaining the outlet temperature of the synthesis gas reformer stably.

In Comparative Example 2 representing the conventional method, when decreasing the operation load is started, decreasing the pressure of the fuel gas is delayed due to a delay in response of feedback control, and the outlet temperature of the synthesis gas reformer rapidly increases. In order to correct the delay, in the next step, the fuel gas pressure rapidly decreases, and accordingly the outlet temperature of the synthesis gas reformer rapidly decreases and falls below a target value (a phenomenon called overshoot).

In addition, it can be seen that the $H_2$/CO ratio in the synthesis gas and the $H_2$±CO flow rate showed behaviors biased to considerable extends from their respective target values while the operation load is lowered from 90% to 80%.

In the conventional method of Comparative Example 2, the delay of the response and overshoot could not be avoided. Therefore, it is evident that the conventional method cannot be applied to the operation load-down control of the synthesis gas reformer.

INDUSTRIAL APPLICABILITY

According to the operation method of the synthesis gas reformer in the GTL plant of the invention, precise control of the outlet temperature of the synthesis gas reformer can be performed.

The invention claimed is:

1. An operation method of a synthesis gas reformer of a GTL (gas to liquids) plant having a process for producing synthesis gas by adding at least steam and $CO_2$ to light hydrocarbon gas to form a mixed fluid and heating the mixed fluid, the operation method comprising:
   setting an operation condition including control target values of a flow rate of $H_2$ and CO contained in synthesis gas reformed by the synthesis gas reformer, a $H_2/CO$ ratio which is defined by a ratio of the number of moles of $H_2$ contained in the synthesis gas to the number of moles of CO contained in the synthesis gas, a steam/carbon ratio which is defined by a ratio of the number of moles of steam added to the mixed fluid to the number of moles of carbon contained in the light hydrocarbon gas, a $CO_2$/carbon ratio which is defined by a ratio of the number of moles of $CO_2$ added to the mixed fluid to the number of moles of carbon contained in the light hydrocarbon gas, and a temperature of the synthesis gas at an outlet of the synthesis gas reformer;
   determining control target values of a flow rate of the light hydrocarbon gas, a flow rate of the steam and a flow rate of the $CO_2$, and an amount of heat needed for the synthesis gas reformer, by the operation condition set, a measured value of the composition of the light hydrocarbon gas, a measured value of the temperature of the mixed fluid at an inlet of the synthesis gas reformer, and a measured value of the pressure of the synthesis gas at the outlet of the synthesis gas reformer;
   controlling operation load of the synthesis gas reformer on the basis of the control target values of the flow rate of the light hydrocarbon gas, the flow rate of the steam, and the flow rate of the $CO_2$;
   setting a furnace efficiency of the synthesis gas reformer;
   calculating a combustion load of a burner, which uses a fuel gas, of the synthesis gas reformer based on values of the furnace efficiency and the amount of heat needed for the synthesis gas reformer;
   calculating a lower heating value of the fuel gas based on a composition measurement of the fuel gas of the burner;
   determining a control target value of the pressure of the fuel gas by the combustion load of the burner, the lower heating value of the fuel gas, and a burner performance curve of the synthesis gas reformer;
   calculating a deviation between the control target value of the pressure of the fuel gas and a measured value of the pressure of the fuel gas; and
   controlling the temperature of the synthesis gas at the outlet of the synthesis gas reformer by adjusting a pressure control valve provided at an inlet of the burner to compensate for the deviation.

2. The operation method according to claim 1, wherein the value of the furnace efficiency is calculated based on measured values of the temperature of a combustion exhaust gas of the synthesis gas reformer, the amount of heat needed for the synthesis gas reformer, a fuel-air ratio of the burner, and the pressure of the fuel gas.

* * * * *